(12) United States Patent
Kramer et al.

(10) Patent No.: US 7,262,783 B2
(45) Date of Patent: Aug. 28, 2007

(54) SYSTEM FOR DELIVERING AND ENABLING INTERACTIVITY WITH IMAGES

(75) Inventors: Gary Kramer, Los Angeles, CA (US); Adam Rubin, Santa Monica, CA (US)

(73) Assignee: Virtual Iris Studios, Inc., Los Angeles, CA (US)

( * ) Notice: Subject to any disclaimer, the term of this patent is extended or adjusted under 35 U.S.C. 154(b) by 173 days.

(21) Appl. No.: 10/791,965

(22) Filed: Mar. 3, 2004

(65) Prior Publication Data

US 2005/0195216 A1 Sep. 8, 2005

(51) Int. Cl.
*G09G 5/00* (2006.01)

(52) U.S. Cl. ........................................ 345/629; 345/619

(58) Field of Classification Search ................ 345/427, 345/619, 629, 649
See application file for complete search history.

(56) References Cited

U.S. PATENT DOCUMENTS

| | | | |
|---|---|---|---|
| 4,669,812 A | 6/1987 | Hoebing | |
| 4,870,485 A | 9/1989 | Downing et al. | |
| 5,117,296 A | 5/1992 | Hoebing | |
| 5,227,898 A | 7/1993 | Iavecchia et al. | |
| 5,682,196 A | 10/1997 | Freeman | |
| 5,740,267 A * | 4/1998 | Echerer et al. | 382/132 |
| 5,818,420 A | 10/1998 | Mitsumine et al. | |
| 5,968,120 A | 10/1999 | Guedalia | |
| 6,009,188 A | 12/1999 | Cohen et al. | |
| 6,023,523 A | 2/2000 | Cohen et al. | |
| 6,031,519 A | 2/2000 | O'Brien | |
| 6,061,083 A | 5/2000 | Aritake et al. | |
| 6,084,590 A * | 7/2000 | Robotham et al. | 345/419 |
| 6,121,963 A * | 9/2000 | Ange | 715/500.1 |
| 6,157,747 A | 12/2000 | Szeliski et al. | |
| 6,167,151 A | 12/2000 | Albeck et al. | |
| 6,211,848 B1 | 4/2001 | Plesniak et al. | |
| 6,219,057 B1 | 4/2001 | Carey et al. | |

(Continued)

FOREIGN PATENT DOCUMENTS

WO WO94/16404 7/1994

*Primary Examiner*—Kee M Tung
*Assistant Examiner*—Michelle K Lay
(74) *Attorney, Agent, or Firm*—Greenberg Traurig, LLP; Marlan D. Walker; Peter J. Gluck

(57) ABSTRACT

A system, including apparatuses, software and methods, is disclosed for capturing and delivering images as to which various interactive functions are enabled for a user. The images introduced to the system can come from any one of a variety of sources, including the scalable image-capturing devices described in the specification. Each image is delivered to a user in its own layer of software, which permits complex sets of images of relatively high resolution to be delivered to users without any appreciable delay associated with the delivery or the need for the user to have additional software, such as a plug-in to receive images and enable interactive functions with respect to the images. A viewer perceives only one image layer at a given time, but the currently viewable image layer can be changed rapidly, so that the user can perceive the illusion of motion, including virtual rotation of an object depicted in a set of images. Interactive images can be rendered on a lenticular sheet assembly according to the invention, which allows a user to perceive the illusion of motion by applying pressure to the lenticular sheet assembly, such as with a finger.

53 Claims, 27 Drawing Sheets

U.S. PATENT DOCUMENTS

| | | | | |
|---|---|---|---|---|
| 6,222,937 | B1 | 4/2001 | Cohen et al. | |
| 6,271,806 | B1 * | 8/2001 | Motoshima et al. | 345/418 |
| 6,323,856 | B1 * | 11/2001 | Smilansky et al. | 345/418 |
| 6,330,523 | B1 | 12/2001 | Kacyra et al. | |
| 6,373,637 | B1 * | 4/2002 | Gulick et al. | 359/619 |
| 6,512,518 | B2 | 1/2003 | Dimsdale | |
| 6,512,993 | B2 | 1/2003 | Kacyra et al. | |
| 6,556,201 | B1 * | 4/2003 | Maehara et al. | 345/427 |
| 6,563,498 | B1 | 5/2003 | Hirata et al. | |
| 6,618,051 | B1 | 9/2003 | Edwards et al. | |
| 6,631,016 | B1 | 10/2003 | Klug et al. | |
| 6,633,326 | B2 | 10/2003 | Fukumoto et al. | |
| 6,883,138 | B2 * | 4/2005 | Rosenholtz et al. | 715/526 |
| 6,885,408 | B2 * | 4/2005 | Hirano | 348/588 |
| 7,065,242 | B2 * | 6/2006 | Petrov et al. | 382/154 |
| 2001/0029829 | A1 * | 10/2001 | Moe | 84/478 |
| 2002/0006234 | A1 | 1/2002 | Horiuchi | |
| 2002/0060686 | A1 * | 5/2002 | Matsumoto et al. | 345/582 |
| 2003/0065590 | A1 * | 4/2003 | Haeberli | 705/27 |
| 2003/0095177 | A1 | 5/2003 | Yun et al. | |
| 2003/0206653 | A1 | 11/2003 | Katayama et al. | |
| 2004/0227751 | A1 * | 11/2004 | Anders | 345/419 |

\* cited by examiner

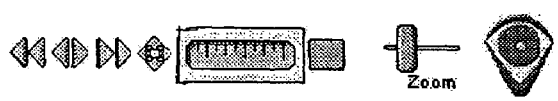
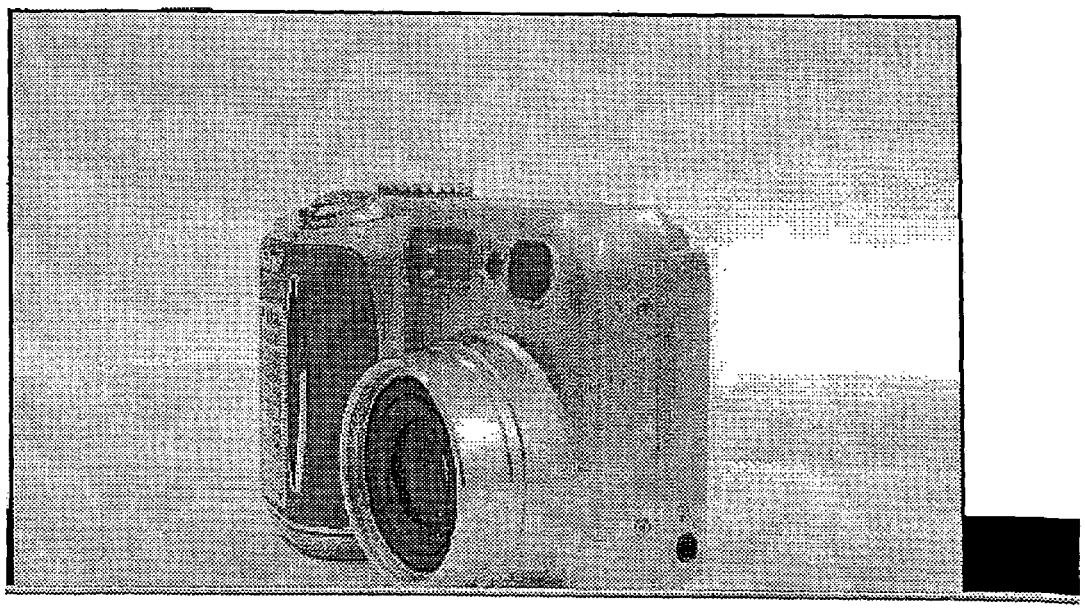
FIGURE 12

SYSTEM FOR DELIVERING AND ENABLING INTERACTIVITY WITH IMAGES

BACKGROUND OF THE INVENTION

1. Field of the Invention

This invention relates generally to systems, including apparatuses and methods, for capturing, processing and displaying images and, more particularly, to systems for capturing, processing and displaying or otherwise outputting images so that a user or viewer can manipulate or otherwise interact with the display/output in one or more ways, such as to give the appearance of two-dimensional (2-D) or three-dimensional (3-D) motion.

2. The Prior Art

There is a demand in the art for systems, including apparatuses and methods, whereby images, either displayed via a computer screen, some other display device, or stored or rendered in some other medium, can be manipulated or interacted with by a user in some fashion, for example, to impart the illusion of movement in two dimensions or three dimensions to an object depicted in an image or images.

Systems and methods are known in which images can be downloaded on web pages to a user's browser through an Internet Service Provider (ISP), stored in the cache memory of the user's computer hard drive, and displayed to the user where thereafter the user is provided with certain options with respect to the images which, when exercised, give the user the perception of interaction with the images in some fashion.

For example, a retailer might maintain a website with an on-line catalog feature. A user can access the website from his or her computer, select an item in the catalog, and the web page corresponding to that item will be sent to the user's computer in response to the request. The web page consists of software that determines what will be displayed to the user (typically, the software is written in accordance with a standardized protocol, such as HTML ("Hypertext Markup Language") or XML ("Extensible Hypertext Markup Language").

Upon delivery to the user, the web page typically is stored in cache memory on the hard drive of the user's computer. If the web page is configured to permit some form of interactivity with the image(s) by the user, the user may be able, for example, to view an item in the catalog, such as a sweater, that is originally presented in the color black, in alternative colors such as white or pink. To engage in this type of interactivity, the user might be prompted to click with his or her mouse on a color chart or some other icon so that the color of the sweater changes from black to white or from black to pink, to see what the item would look like in a different color. Similarly, the user might be able to click on the image or on some other icon to see an enlarged view of an item, e.g., a "zoom" of the item.

With such prior art systems, however, the more complex the content of the web page, generally the longer it takes to deliver the web page to the user and to ready image(s) for display or interactivity. For example, a file that corresponds to a single, relatively high-resolution image (e.g., an image with a resolution of 1024×768 pixels) is larger than, and therefore will take longer to deliver than, a lower resolution image (e.g., an image with a resolution of 320×240 pixels). Thus, prior art systems might offer users lower resolution images in order to avoid the extended delivery time that would be perceived by the user if higher resolution images were to be offered. The lower resolution of the delivered images leads to a disadvantage in prior art systems in which one of the possible interactive functions is a "zoom" function. That is, the quality of an image when it is zoomed in on, depends in part on the resolution of an image. The higher the resolution of an image, generally the longer it takes to deliver the image to a user. Thus, maximum resolution of a zoomed-in-on image often must be sacrificed in favor of faster image delivery times in these systems. Consequently, prior art systems typically start by delivering images of lower resolution (e.g., 320×240 pixels) to a user, such that when a zoom interactive function is later initiated, the zoomed-in-on image appears less clear or less sharp than the original image (i.e., the non-zoomed-in-on image), or even becomes distorted (e.g., pixelated) upon zooming. Thus, there is a need for a system that allows delivery of, and subsequent interactivity with, an image or images that will have quality resolution even upon zooming. The present invention satisfies this need.

Moreover, when prior art systems offer users the option of an interactive function with respect to images that results in the illusion of a virtual 3-D effect, such as, the illusion of rotation of an object through three dimensions, multiple images of the object are required to achieve the effect. Typically, a set of images of the object are taken through 360 degrees in a particular plane. The greater the number of images, the smoother the rotation effect will be when the interactive function is later carried out. In order to deliver the multiple images to the user, however, prior art systems first combine the multiple images into a single file and then deliver that file to the user. The more the images, the larger the file. The larger the file, the longer the images take to be delivered. In these systems, therefore, trade offs might have to be made that disadvantageously affect the quality of the interactive functions that a user can carry out with respect to the images, in order to avoid lengthy delivery times. Alternatively, the user will just have to accept long delivery times in order to view images using the prior art systems.

Accordingly, web pages containing images with which a user has some limited opportunity to interact can take too long, from the perspective of the user, between the time a request is made for the web page and the time the image(s) on the web pages are first perceptible to the user and then made available for any interactivity.

Further, prior art systems that provide a user with the opportunity to carry out more sophisticated interactive functions with respect to an image or images on a web page, such as obtaining different perspective views of an object in an image (e.g., front, back and side views), 360-degree views (e.g., a panoramic view of a piece of real estate or of the inside of a hotel room), or zooming in on an object in an image, often require supplemental software or software in addition to that contained on the web page in order to enable these interactive functions. Such additional software commonly is provided in the form of a "plug-in," a software program that the user either already must possess on his or her local computer's hard drive or which must be downloaded to the user's local computer before any higher level interactive functions may be initiated. The necessity for a plug-in as a prerequisite to interactivity is an added level of complexity that it would be desirable to eliminate. The plug-in also may be associated with a fee or some other commitment the user would rather avoid, may require a separate, time-consuming procedure to download and install and, may generally detract from a user's enjoyment of, or willingness to use, a particular website.

Software protocols have been developed, for example, DHTML ("Dynamic Hypertext Markup Language"), which are designed to allow programmers to construct web pages that have the capacity for a higher degree of user interactivity. To date, however, no software has been developed that advantageously: (1) provides a user with the ability to rapidly perceive images on a web page, howsoever complex, after the request for the web page is processed; and (2) permits a sophisticated level of interactivity and a broad range of interactive options with respect to images, once the web page has been delivered. Thus, there is a need in the art for an improved system for rapidly delivering images to a user with which a user can initiate a broad range of advanced interactive functions. The present invention satisfies these needs.

In connection with the desire of website designers to provide content in the form of images with which a user can engage in some high-level interactive functions upon downloading the pertinent web page(s), there is also a demand in the art for systems, including apparatuses and methods, which facilitate the creation of the images in the first instance, with which interactivity will later be enabled. Presently, there are likely many individuals, businesses, or government agencies who, without necessarily maintaining or operating their own websites, nevertheless are desirous of creating images that either are digitized or convertible to digital form, which ultimately can be made available for downloading by users via a web page from a website, and which can be interacted with by a user to some degree once downloaded. Currently, such individuals, businesses, or government agencies typically must engage the services of a third party service provider or consultant to create the images, even if they already maintain their own websites, and have little control over the various aspects of the image-capturing process. Thus, resorting to such a third party provider might be perceived as prohibitively expensive to many potential image creators, or simply more trouble than it is worth to embark on the process. Moreover, most individuals, businesses, and government agencies are not likely to be aware of what is required to create the images needed to ultimately enable interactivity. For example, one possible interactive function that might be desired with respect to an object in an image on the web page might be to rotate the object about one axis to obtain a 360-degree view of the object. Generally, in order to implement a "rotate" function, a set of images of the object to be virtually rotated on a display (or on some printed form) must be acquired at incremental angles, such that when the individual images are viewed sequentially in fairly rapid succession, an illusion of rotational movement is perceived by the user. A typical prospective image creator is not likely to have access to the equipment or fixtures necessary to acquire such a set of images.

Assuming that processing software is commercially available that would enable interactivity once the appropriate input images have been obtained, the average prospective image creator is not apt to have knowledge of, or access to, the resources for creating the requisite images as a prerequisite first step. Prior art systems are known in which apparatuses and methods are used to capture images of an object which later will be manipulable by software or, alternatively, rendered manipulable by physical movement (e.g., moving the rendered images on a lenticular sheet relative to the eyes of a viewer). Such systems tend to be cumbersome and expensive in terms of time, resources or financial requirements, owing to the complexity of the image-capturing devices and/or the number of method steps needed to capture and process the images. In addition, access to the technology currently available to transfer images to a medium with which a user can interact so as to perceive the illusion of motion of an object depicted in the image(s) can be limited, based on equipment and material needs. Thus, individuals, businesses, or governmental agencies lacking the necessary expertise but who are nonetheless desirous of creating virtual 2-D or 3-D images that can be manipulated or interacted with on a computer display or otherwise (e.g., on some form of print media), must engage a third party service provider that will control almost all aspects of the image capture, processing, and display/output. The engagement of a third party typically is more expensive and more time-consuming than the user would like, and often yields images or degrees of manipulability or interactivity that are less than satisfactory to the user.

Thus, a need exists too for a system, including apparatuses and methods, by which users efficiently and cost-effectively can acquire an image or images that ultimately can be enabled for one or more interactive functions (e.g., perceived translation or movement from point a to point b or, in virtual 3-D applications, rotation to convey the illusion of movement in 3 dimensions). The present invention clearly fulfills this need.

As mentioned above, images with which some level of interactivity (or perceived interactivity) is enabled are not limited to images delivered via a web page to a user's computer display. For example, interactive images can be displayed in air, such as, using holography or a similar technology. Interactive images also can be stored on various media, such as computer hard drives, CD-ROMs, and DVD-ROMs. Further, interactive images can be rendered in a variety of printed media, such as by using lenticular printing.

Lenticular printing is based on the concept of laying a plastic lens over a series of printed dots or, alternatively, printing a series of dots on a plastic lens. Lenticular lenses are convex, and typically take the form of parallelogram with a generally semicircular cross-section, similar in appearance to a tiny Quonset hut. Multiple lenticular lenses are provided in one lenticular sheet. The curvature of the lenses focuses the eyes on different parts of the arrangement of printed dots, depending on the angle from which the lenticular sheet is viewed. Each of the multiple lenses on the lenticular sheet acts like a magnifying glass. That is, each lens magnifies the image that is printed on or under each lens. Each lens has a profile which resembles the grooves in a record album, albeit the grooves in the lens are disposed in parallel rows. Each lens magnifies the light and the image, thus enhancing the appearance of the image. Lenticular sheets can be made from a variety of different plastics, depending on the applicable printing specifications. These plastics include flexible polyvinyl chloride ("PVC"), amorphous polyethylene terephthalate ("APET"), polyethylene terephthalate glycol ("PETG"), acrylic, styrene, and polycarbonate, and other similar materials. The density of a lenticular sheet is commonly characterized in terms of the number of lenses per inch ("lpi"). Current technology allows lenticular sheets to be created with up to 1,000 lpi, permitting razor-sharp lenticular images to be rendered on material that is about as thin as a page in a typical magazine.

Current lenticular technology allows an interactive effect to be perceived by a user, e.g., the illusion of movement of an object, such as an eye opening and closing, or the illusion that one object changes or "morphs" into a different object. A "zoom" effect can also be achieved. Typically, each image in a set of images needed for the chosen effect is apportioned into a certain number of strips or squares. The strips or squares are then distributed over a predetermined or selected number of the lenticular lenses that comprise a given lenticular sheet. Each strip or square either is printed on, laid on top of, or affixed to, a corresponding portion of a lenticular lens, or, alternatively, the strips or squares can be distributed on a flat surface that the lenticular sheet bearing the lenses is then laid on top of or over. In this manner, the user can perceive a different one of the images in the set of images when the user tilts his or her head relative to the lenticular sheet or when the lenticular sheet is tilted relative to the user. Disadvantageously, while the user is perceiving the transition from one image disposed on the lenticular sheet to the next image, the user occasionally also perceives a "bleeding" effect, whereby part of the first image is perceived at the same time as the next image. It would be desirable to minimize or eliminate this bleeding effect in connection with lenticular sheets.

With respect to rendering interactive images in a printed form such as a lenticular sheet, and as is similarly the case with creating the input images prerequisite to enabling interactivity in the first instance, the technology necessary to configure images for use with lenticular sheets and the like, is not technology that is generally accessible to most individuals or businesses who might be desirous of using it. In addition, the interactive functions available with current lenticular technology, e.g., the effect of motion, changing objects, rotating an object, and zooming in on an object, generally can only be enabled by physically tilting the lenticular sheet with respect to the eye, or by changing the orientation of one's head with respect to the lenticular sheet. Lenticular technology would be rendered more flexible for a variety of other applications if the interactive functions could be enabled by means other than tilting the lenticular sheet or tilting the viewer's head. Thus, there is a need in the art for systems, including apparatuses and methods, which make the technology necessary to create interactive image displays or stored or printed interactive images more convenient and readily available to prospective users. The present invention also satisfies this need.

SUMMARY OF THE INVENTION

Briefly, and in general terms, the system according to the invention delivers a set of images to a user in a form with which the user can undertake a variety of interactive functions, so as, for example, to allow a user to view an object in virtual 3-D or to interact with it in two dimensions. Where only a 2-D effect is desired, the set of images need only comprise a single image for the interactive functions to be enabled.

Optionally, images are edited as to features such as background color, unwanted extraneous artifacts, etc., prior to being introduced to the software of the system and delivered to a user.

In one aspect on the invention, features are provided that have the effect of optimizing the speed with which a user perceives a set of images to be delivered in response to a user's request for the set of images, whereby the set of images is delivered via software implemented through or embedded on a web page that permits each of the set of images to be provided in image layers according to the layering feature available in software protocols such as, but not limited to, DHTML. Only one of the images in the set of images is viewable or perceivable by the user at any one time, and, at the moment of delivery, the user is able to immediately perceive a selected one of the images while the remainder of the images comprising the set of images are delivered after it. Where only one image is needed in order to carry out an interactive function, e.g., zooming in on an image of an object taken at just one angle, the set of images will only comprise a single image, and the same layering technique can be applied to deliver, for example, a single image with relatively high resolution to the user without the user's perceiving any appreciable delay associated with the delivery process.

Optionally, and in accordance with another aspect of the invention, each image in a given set of images can be split via software into multiple parts, prior to commencement of delivery of the images (e.g., during editing), such that if the connection over which delivery takes place is interrupted for some reason during the delivery process, those parts of the image for which delivery has been completed do not need to be re-sent when the connection is re-established.

According to still another aspect of the invention, in addition to the image layers corresponding to a set of images that are delivered to a user in response to the request for the image(s), a tool bar layer is provided with a tool bar that is made viewable to the user along with a currently viewable image layer. Optionally, the tool bar can be provided directly in the currently viewable image layer, as opposed to in a dedicated tool bar layer.

In still another aspect of the invention, a transparent layer is provided in which commands from a mouse (or other device capable of delivering commands comparable to those deliverable by a mouse) can be interpreted by the system and carried out such that, for example, when the transparent layer is moved, each of the image layers is moved along with it. The transparent layer is invisible to the user, but in terms of the configuration of the display, the transparent layer is preferably disposed between the tool bar layer and the currently viewable image layer. Optionally, the transparent layer can be eliminated, and the commands from a mouse can be interpreted by the system from the currently viewable image layer.

In a further aspect of the invention, both a first transparent layer and a second transparent layer are provided, where the second transparent layer remains fixed with respect to the first transparent layer, so that when a mouse is dragged to move the first transparent layer from a first set of coordinates to a second set of coordinates, a line corresponding to the distance the mouse has been dragged by a user can be drawn on the second transparent layer. Optionally, the second transparent layer can be eliminated, and a line corresponding to the distance the mouse has been dragged by a user can be drawn directly on the currently viewable image layer.

The interactive functions can include: (1) permitting a user to move the tool bar around on the display, for example, to move it out of the way of the currently viewable image layer; (2) zooming in or out of an object depicted in the currently viewable image layer; (3) resetting the currently viewable image layer, together with any tool bar layer and transparent layer that might be provided, to the condition the layers were in at the point of delivery of the set of images to the user; (4) measuring an object depicted in a set of images and obtaining information corresponding to the actual physical dimensions of the object; (5) causing an object depicted in a set of images to appear as if the object were automatically rotating to the right or, alternatively, to the left, to a degree and within a period of time automatically controlled by the system ("autorotate"); and (6) causing an object depicted in a set of images to appear as if the object is rotating to the right or to the left, to a degree and within a period of time controlled by the user via user commands delivered to the system by, for example, a mouse ("manual rotate").

The system according to the invention for image capture, processing and display in an interactive 2-D or 3-D form employs various types of devices for image capturing, such as various types of enclosures, kiosks and photo booths, outfitted with one or more cameras or lenses, configured so that the cameras or lenses can acquire multiple images of a stationary object inserted into the enclosure, kiosk and/or photo booth from a variety of different angles and, optionally, in a variety of different planes. Alternatively, an image-capturing enclosure may be outfitted with a single camera or lens and a fixture for moving the object inserted into the enclosure relative to the single camera or lens, so that the object may be moved relative to the camera or lens for acquiring images at a variety of different angles and/or in a variety of different planes. In addition, a combination of a plurality of cameras or lenses and a movable fixture for the object may be employed in the enclosure, kiosk or photo booth to allow greater flexibility during the image-capturing process. The captured images can then be delivered to a device with which interactive functions can be carried out with respect to the images, such as the display of a computer, PDA ("Personal Data Assistant"), or some other wireless device.

The system according to the invention also permits a user to take a captured set of images and render them in an interactive medium other than a display, such as a lenticular sheet, whereby the illusion of 2-D or 3-D motion is initiated by one or more of following: movement of the user's eye with respect to the lenticular sheet, movement of the lenticular sheet with respect to the eye, and/or by the application of pressure to the sheet in, for example, a horizontal or vertical direction by a user.

Other features and advantages of the present invention will become apparent from the following detailed description, taken in conjunction with the accompanying drawings, which illustrate by way of example, the features of the present invention.

BRIEF DESCRIPTION OF THE DRAWING FIGURES

FIG. 12 is a perspective view of a display according to one embodiment of a system according to the invention before a reset function has been performed.

DETAILED DESCRIPTION OF THE PREFERRED EMBODIMENTS

Persons with ordinary skill in the art will appreciate that the following description of the present invention is illustrative only and not in any way limiting. Other embodiments of the invention will readily be suggested to such skilled persons having the benefit of this disclosure.

Figure 1:
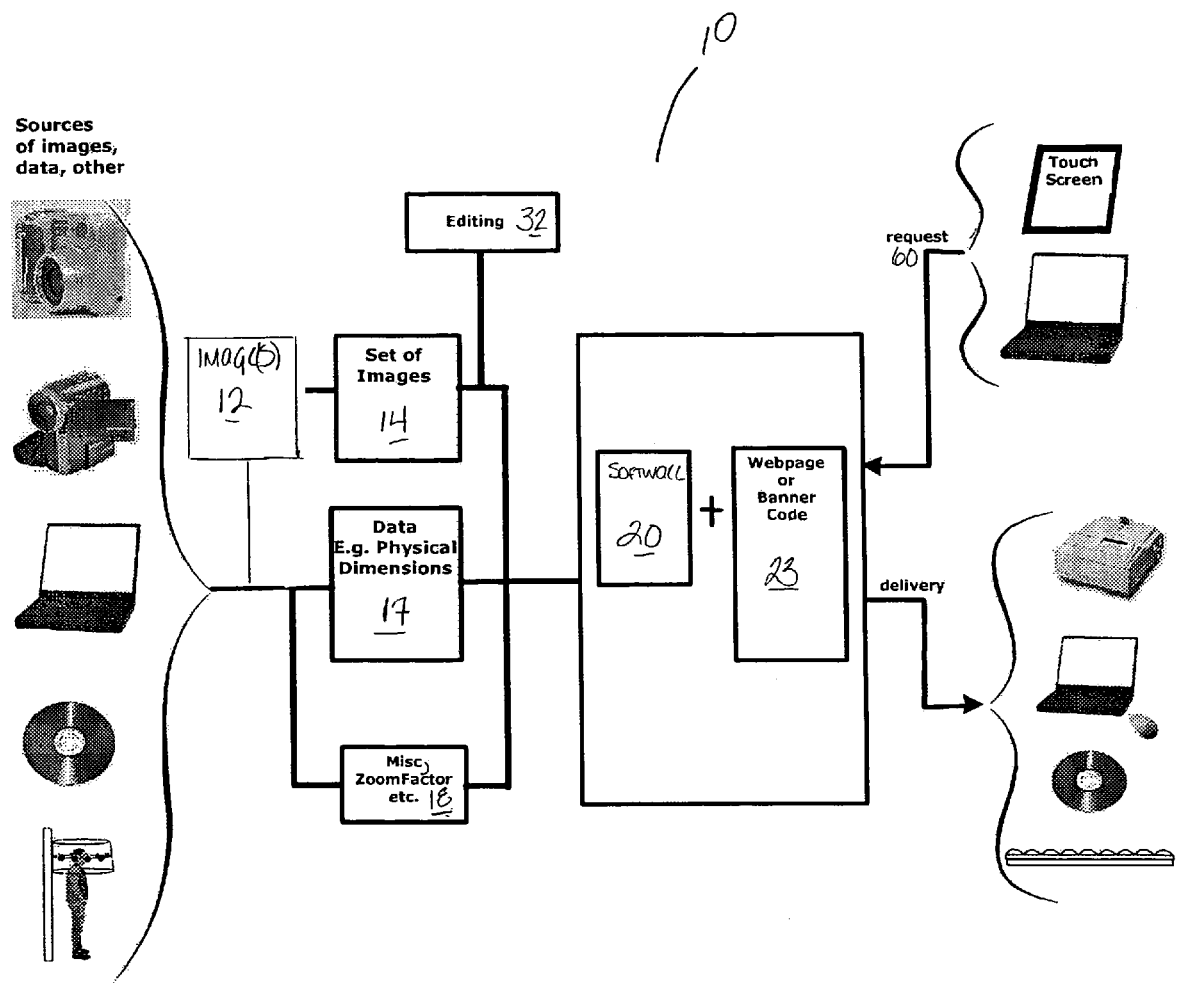
FIG. 1 is a schematic view of a system according to a preferred embodiment of the present invention.

Referring now to the drawings, wherein like reference numerals denote like or corresponding parts throughout the drawings, and more particularly, to FIG. 1, there is shown a presently preferred embodiment of a system 10 according to the invention. One or more images 12 comprising a set of images 14 are introduced to the system 10 for further processing, in order to make available certain interactive functions with respect to the set of images 14.

The number of images 12 in a set of images 14 depends, in part, on the level of sophistication of the interactive functions that are to be enabled for that set of images 14. For example, when the interactive functions to be carried out do not require a 3-D effect, only one image 12 may be necessary for such interactive functions to be accomplished, accordingly, the set of images 14 may contain only a single image 12. However, if the user is to be able to interact with a set of images 14 in order to perceive the illusion of 3-D, then more than one image 12 will be necessary than if only a 2-D effect for the user is desired.

Figure 2:
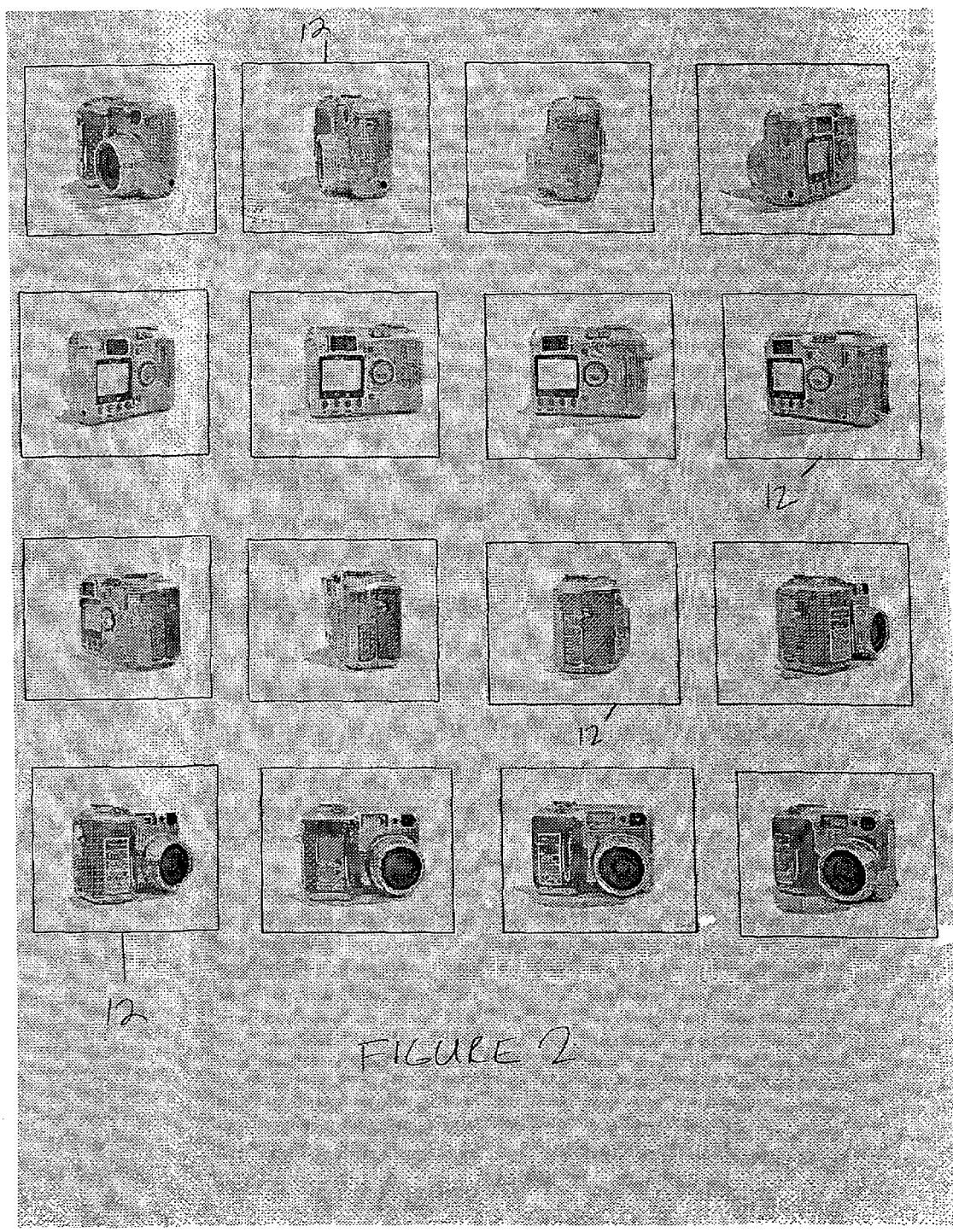
FIG. 2 is a schematic view of a set of images to be introduced into a preferred embodiment of a system according to the present invention.

For a basic virtual 3-D image, the set of images 14 typically comprises sixteen images 12 of the object 16, where each image 12 of a target object or scene is taken from a different angle, while desirably keeping the target object or scene at the same focal point for whatever device is used to capture the images 12. For example, with reference to FIG. 2, a set of images 14 is shown that comprises sixteen images 12 of an object 16, which happens to be a camera, that were captured by a digital camera.

Figure 3:
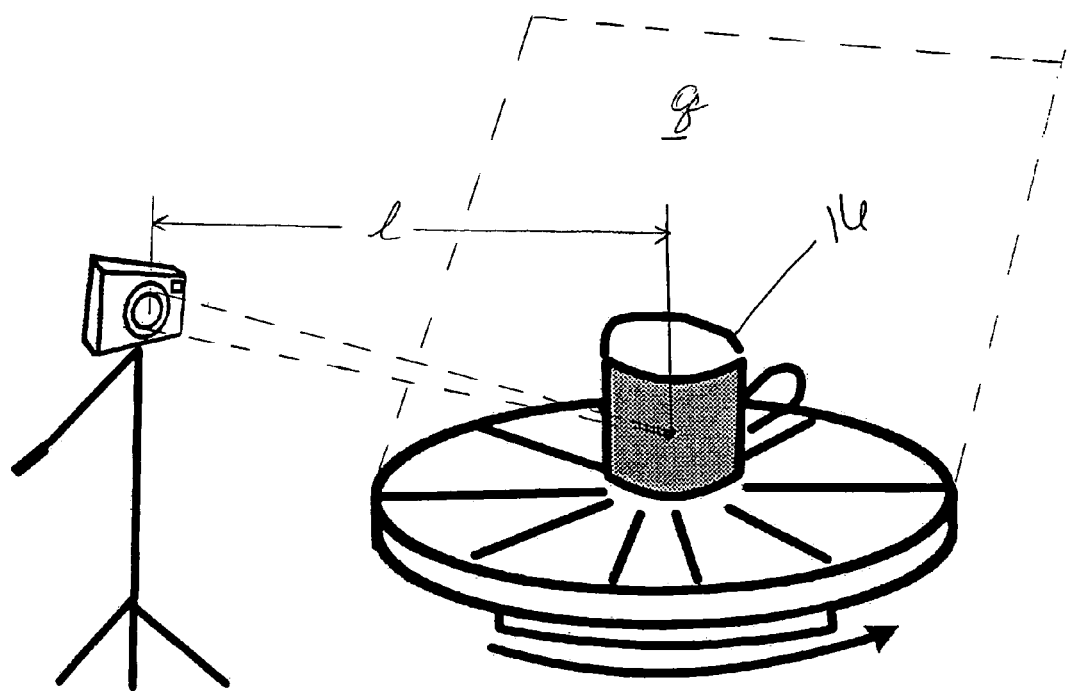
FIG. 3 is a perspective view of one method of acquiring a set of images to be introduced into a preferred embodiment of a system according to the invention.

Referring now to FIG. 3, each image 12 shown was shot or taken from a different incremental angle about 360 degrees in certain plane of the object 16, for example, every 22.5 degrees in the plane q of the object 16, but the object 16 was kept at the same focal length from the digital camera that was used to take the pictures. Thus, it can be appreciated that if the sixteen images 12 were viewed in sequence and in rapid succession, then the viewer would effectively perceive a 360-degree view in a particular plane q of the object 16.

If the level of interactivity to be enabled is more sophisticated, such as allowing a user to virtually rotate an object in an image through a first 360 degrees in a first plane and a second 360 degrees in a second plane (i.e., to virtually spin an object in an image about two axes), then some multiple of sixteen images of the object 16 likely would be required, such as thirty-two images. A gyroscopic effect, i.e., wherein an object appears to be capable of rotating in any plane, can be achieved if sufficient images in those planes are acquired. Although in the foregoing examples the numbers of images happen to be sixteen and a multiple of sixteen, virtually any odd or even number of images could be employed in keeping with the present invention.

In a preferred embodiment of the system 10 according to the invention, if the images 12 comprising a set of images 14 are not originally in digital form, the images 12 are converted from the original form into digital form by any of several methods well known to those of ordinary skill in the art before being the images 12 are introduced to the system 10. It is contemplated, however, that in other embodiments of the system 10 of the invention, the images 12 could be introduced to the system 10 in any non-digital form, without the need for conversion to digital form if the original form is not digital.

Optionally, an editing facility or feature 32 is provided in which the images 12 in the sets of images 14 can be edited before being submitted for processing. In cases where a set of images 14 comprises a set of images of an object or scene taken from multiple angles, during the optional editing feature 32, the discrete images can be combined into a single image file, which subsequently can be edited with respect to such features as background color, contrast, brightness, grey scale, or any other number of editable aspects of a digital photograph, such as made available by several commercial editing programs.

For example, if the images 12 are a set of images 14 that has been acquired by a digital camera then the set of images can be combined, either vertically or horizontally, to create a single image file. There are several commercially available software packages with which such combination and editing can be combined, such as the packages sold under the trade name PHOTOSHOP by Adobe Systems, Inc. As will be obvious to one with ordinary skill in the art pertaining to this invention, other editing software programs exist or can be developed which allow various editing functions to be performed on combined sets of images.

Once combined in such an editing program, the images can be edited quickly and efficiently, because any changes made will be made to all of the images in the combined file (e.g., changing the background color will change the background color for all of the images comprising the input). Alternatively, the editing functions provided in the editing facility 32 can include functions that operate on single images, or less than all of the images in the set of images that comprise a set of images 14.

The set of images 14 is introduced into the system 10 where the set of images 14 is processed by software 20 that is implemented on a suitable computer or processor. Optionally, along with the set of images 14, other information relating to the set of images 14 also can be introduced into the system 10, such as information concerning the actual physical dimensions of an object 16 depicted in a set of images 14 (e.g., the height, width, and/or depth of the object in inches, feet, etc.), and information that controls certain aspects of the interactive functions that are enabled for the set of images 14 (e.g., a zoom factor that determines the maximum degree to which an image can be zoomed in on). Alternatively, the software 20 may calculate the actual physical dimensions of an object 16 depicted in a set of images 14, based on information concerning the actual physical dimensions of the location at which the images 12 were captured, together with information concerning the focal length, l, of the camera with respect to the object 16, etc. Similarly, the software 20 may apply default values if information that optionally can be introduced is not, in fact, introduced, such as a default value for the zoom factor.

The software 20 both controls the manner in which the set of images 14 is delivered to a user in response to the user's request 60 and, once the set of images 14 is delivered, permits the user to initiate and carry out a variety of interactive functions with respect to the set of images 14. Depending upon the application, these interactive functions may include providing the user with the illusion of moving an object 16 in two dimensions (e.g., vertically or horizontally), zooming in on an object 16, or rotating an object 16 to obtain a 3-D effect.

The software 20 advantageously can be added to the HTML or XML code 23 that already exists on a third party provider's web pages (either as developed by the web site provider or as contained in a banner advertiser's content for the web site provider), so as to provide the third party website provider or banner advertiser with the ability to offer users (1) the perception of fast image download or delivery time; and (2) 2-D or virtual 3-D viewing without the necessity of the user either already having or having to download plug-ins to enable the interactivity; and (3) enhanced image quality when a zoom in function is carried out.

In a presently preferred embodiment of the system 10 according to the invention, the software 20 is written in the language corresponding to the software protocol known as DHTML or "Dynamic Hypertext Markup Language," and advantageously uses the layering feature available in the protocol. However, as would be apparent to one with skill in the art, the system 10 could be implemented by using any other protocol or language, suitable for web-based use or non-web use, that permits apportionment of sets of images for fast delivery to a user with which the user can initiate interactive functions such as those described herein. That is, in a preferred embodiment of the system 10 according to the invention, the software 20 is written in a language that is specifically used in connection with web pages that are intended to be viewed using a browser, i.e., a "client" software program that allows a user to view web pages and which usually is used to search for and view web pages from a website accessible over the Internet. (A browser can also be used to view web pages that are stored on a suitable device such as a CD-ROM or a local computer hard drive, without the need for an Internet connection.) However, the basic functionality of the software 20, e.g., the results achieved by apportioning each of multiple images of an object into discrete layers and making only one of the multiple images viewable to the user at a given time, can also be implemented in other languages, such as C, where the intended use of the system 10 is a use not related to the Internet.

Figure 4:
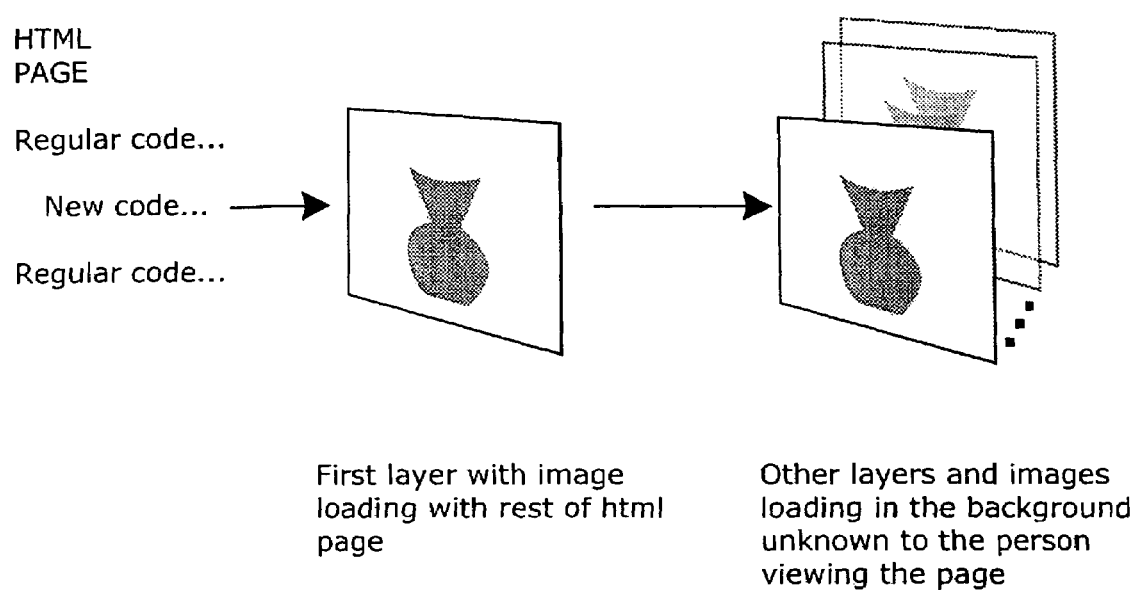
FIG. 4 is a schematic diagram of certain processing steps according to a preferred embodiment of a system according to the invention.

The functionality of the software 20 can be described as follows: When the system 10 according to the invention detects a request 60 for a certain set of images 14 that are present on a third party website, the requested set of images 14 is delivered to the user by taking advantage of the layering features that are available in the DHTML software protocol. Specifically, by example and with reference to FIGS. 4-5, if the user sends a request related to an object 16 that is viewable to the user on a third party provider's website, the system 10 according to the invention will couple or add the software 20 with the code on the web page that the third party website provider otherwise would deliver to the user in response to his or her request. So coupled, and upon delivery to the user, the software 20 will instantaneously create a DHTML layer 200 for each file that corresponds to the set of images 14 that are requested. If the set of images 14 associated with the object comprises sixteen images 12, then sixteen layers 200*a*-200*p* will be created. Each of the image layers 200 is originally sized to have approximately the same dimensions in terms of height and width (although the dimensions of each image layer 200*a*-200*p* can change when certain interactive functions, such as the zoom function, are performed). Importantly, the first layer 200*a* created for a predetermined one of the images 12 (i.e., whichever image 12 the user is intended to see first) will be immediately perceptible or viewable by the user upon delivery in a viewable area defined by a border on the user's display. Thus, upon the website's processing of the user's request 60 for the pertinent web page, the user will immediately perceive one of the multiple images associated with the request. From the perspective of the user, therefore, there is virtually no delay between the time the request for the web page is processed and the time the first image is viewable.

While the user is perceiving the image file disposed in the first layer 200*a*, the other fifteen layers 200*b*-200*p* are being created after it, but are not yet made visible to the viewer. In the system 10 according to the invention, only one image layer 200 is made perceptible or visible to a user at any given time. Whichever image layer is perceptible or visible is the currently viewable image layer.

Typically, then, and dependent upon the speed with which the user can obtain the set of images 14 associated with his or her request (i.e., speed dependent upon the nature of the connection, e.g., dial-up or the higher speed DSL or T1 connections), the user will perceive an image corresponding to his or her request almost immediately, and will not have to wait for all of the images 12 in the set of images 14 to be delivered to his or her computer's cache memory or hard drive. Similarly, the user can view the set of images 14 without any delay as typically would be incurred when images are delivered using JAVA (an object-oriented programming language developed by Sun Microsystems, Inc.), and without the necessity of any additional software, such as that provided in a plug-in. (While additional software such as that commonly contained in a plug-in is not necessary for a user to use the system 10 according to the present invention, it is contemplated that the software 20 of the system 10 might be provided to enable delivery of sets of images 14 and interactivity with sets of images other than via a web page, such as in an application program that is made available to users separately from the sets of images 14 and web pages, for example, by being downloaded from a website or provided on a CD-ROM.)

As mentioned above, the system 10 according to the invention can be used advantageously to deliver sets of images 14 that are part of the primary content of a website, or alternatively, in connection with banner advertisements. For example, the sets of images 14 could be delivered as part of a banner advertisement that a third party advertiser has arranged with the website provider to deliver on certain web pages that are requested by a user.

Figure 6:
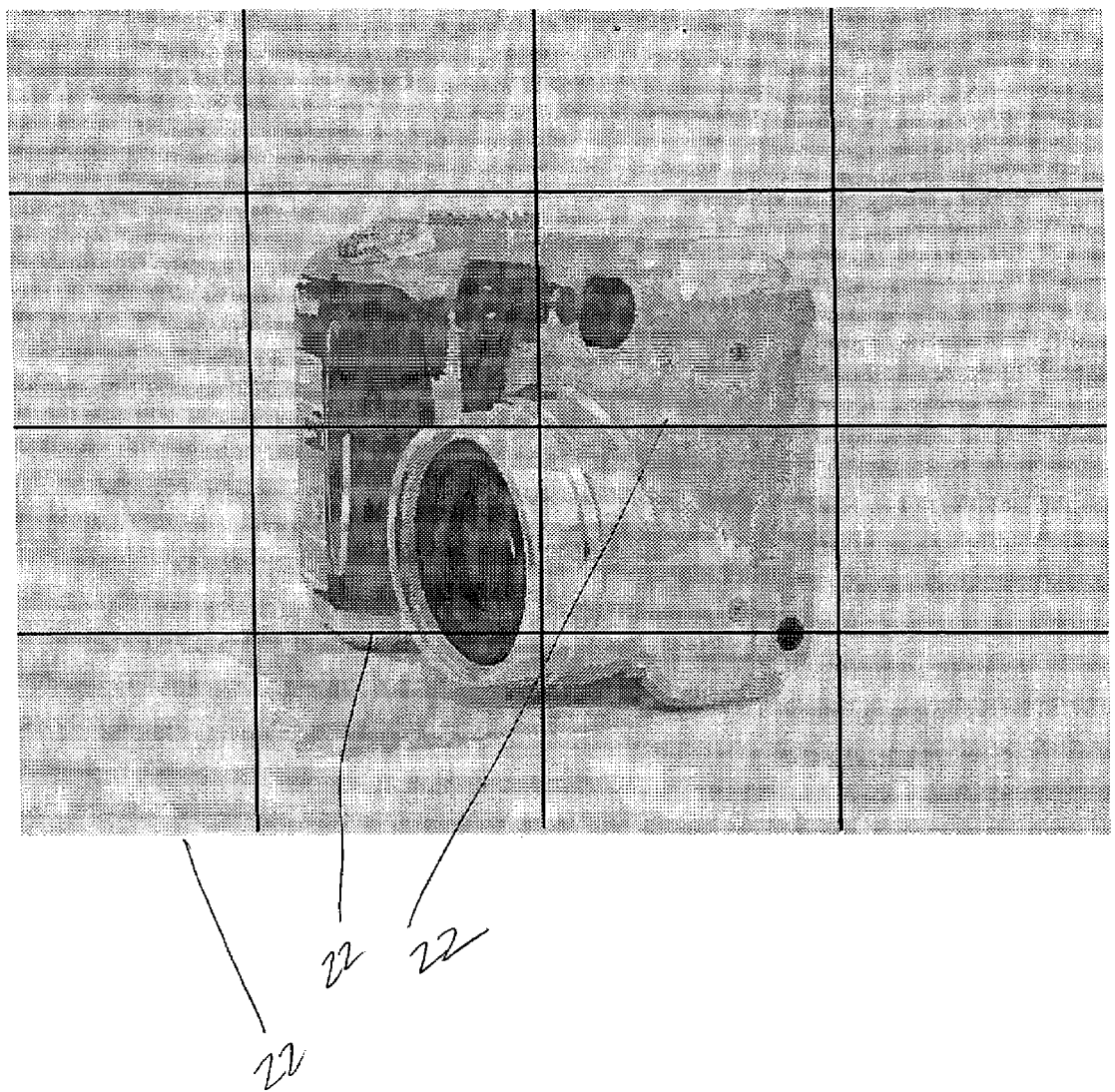

With regard to the nature of the connection the user has with respect to the website from which the requested set of images 14 are delivered, when the connection is a relatively slow connection, such as a dial-up modem connection, one embodiment of the system 10 according to the invention further apportions each of the images 12 in the set of images 14 for delivery into a grid of multiple parts or "splits" 22 for delivery. An example of an image 12 that has been "split" into sixteen parts is illustrated schematically in FIG. 6. If the dial-up connection is corrupted or lost in the middle of delivery of a web page, the splits 22 that made it to the user's cache memory or hard drive before the connection was lost do not have to be re-sent when the connection is reestablished. Once delivery of all of the splits 22 corresponding to an image 12 have been delivered to a user, a single image layer 200 is created for that image 12 and the splits are not perceptible to the user. In a currently preferred system 10 according to the present invention, the number of splits 22 that each image file is apportioned into for delivery is sixteen or thirty-two, but any odd or even number of splits can be accomplished.

Figure 5:
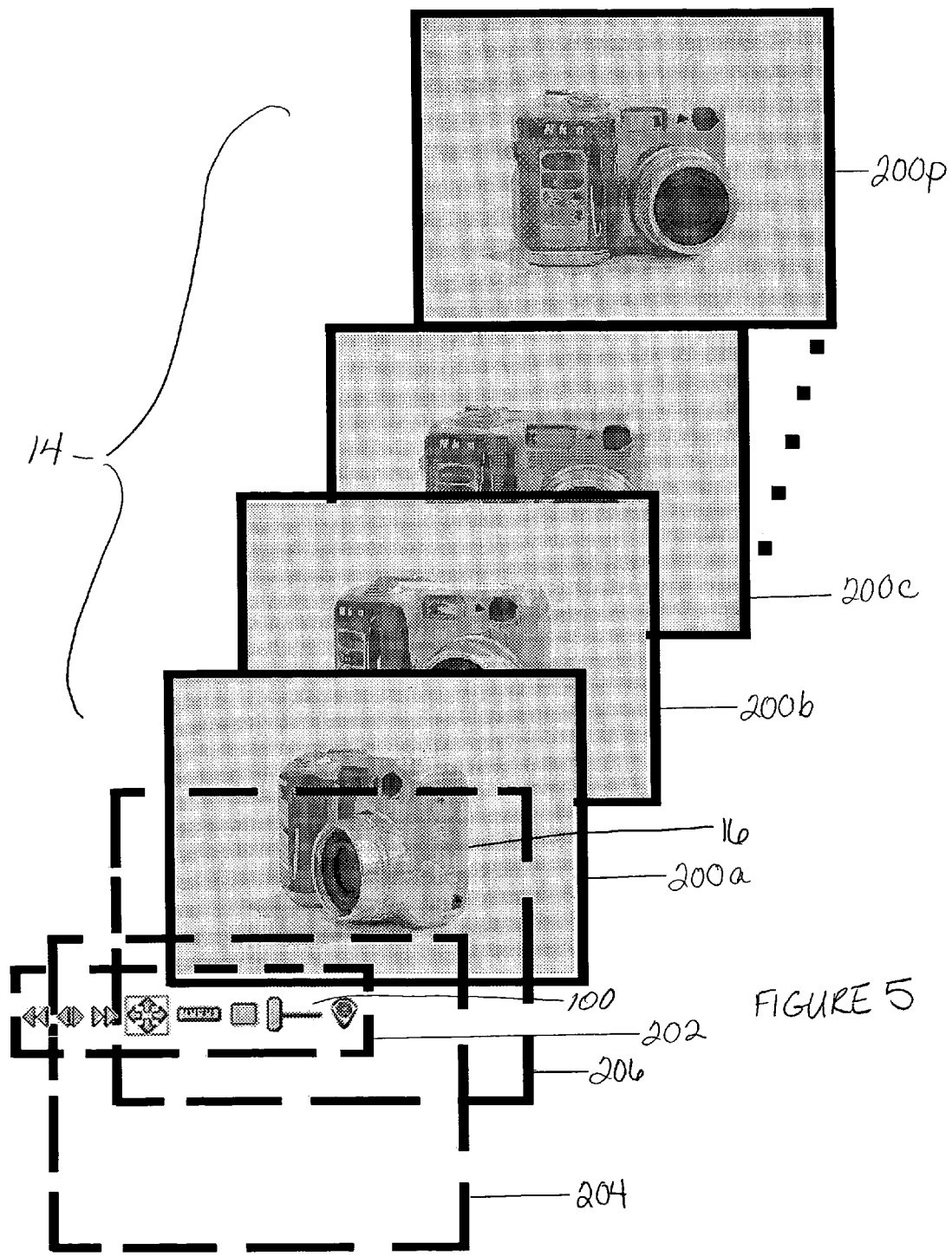
FIG. 5 is a schematic view of a layering technique used in one embodiment of a system according to the present invention.

In a presently preferred embodiment of the system 10 according to the invention, and with reference again to FIG. 5, three additional layers are created upon delivery of the set of images 14 in addition to the layers 200 with the image files as are described below. A tool bar layer 202 is created that contains a tool bar 100 which is also made viewable to the user along with the predetermined one of the image layers 200a at the time of initial delivery of the set of images 14. With reference to FIG. 5, it will be appreciated that the tool bar layer 202 has at least one dimension that is generally less than the corresponding dimension of the image layers 200, for example, the tool bar layer 202 might have approximately the same width as the image layers 200 but a height that is substantially less than the height of the image layers 200, so that whichever image layer 200 is currently viewable to the user can be clearly seen despite the presence of the tool bar 100.

Underneath or behind the tool bar layer 202, and on top of or in front of the image layers 200, a first transparent layer 204 is provided. Unlike the tool bar layer 202, the first transparent layer 204 is sized to have dimensions that approximate the dimensions of the image layers 200, both in terms of height and width. Whenever the currently viewable image layer 200 is caused to change in size, e.g., during a zoom interactive function, the first transparent layer 204 adjusts in size to match that of the currently viewable image layer 200.

The first transparent layer 204 is especially useful in carrying out certain of the interactive functions with respect to the set of images 14, i.e., the manual rotate function and the measuring function as described hereinbelow. The transparent layer 204 also allows other of the interactive functions to be carried out efficiently, such as the pan or move function, because movement of the first transparent layer 204 causes all of the image layers 200 to move along with it. (Under some circumstances, the first transparent layer 204 may afford the additional advantage of limiting the degree to which a user may copy the currently viewable image in the image layers 200, as the copy function may result in the copying of no more than the first transparent layer 204 and/or the first transparent layer 204 and the tool bar layer 202.)

Underneath or behind, from the perspective of the display, the first transparent layer 206 is provided a second transparent layer, which primarily is used in connection with the measuring function described hereinbelow.

Figure 7:
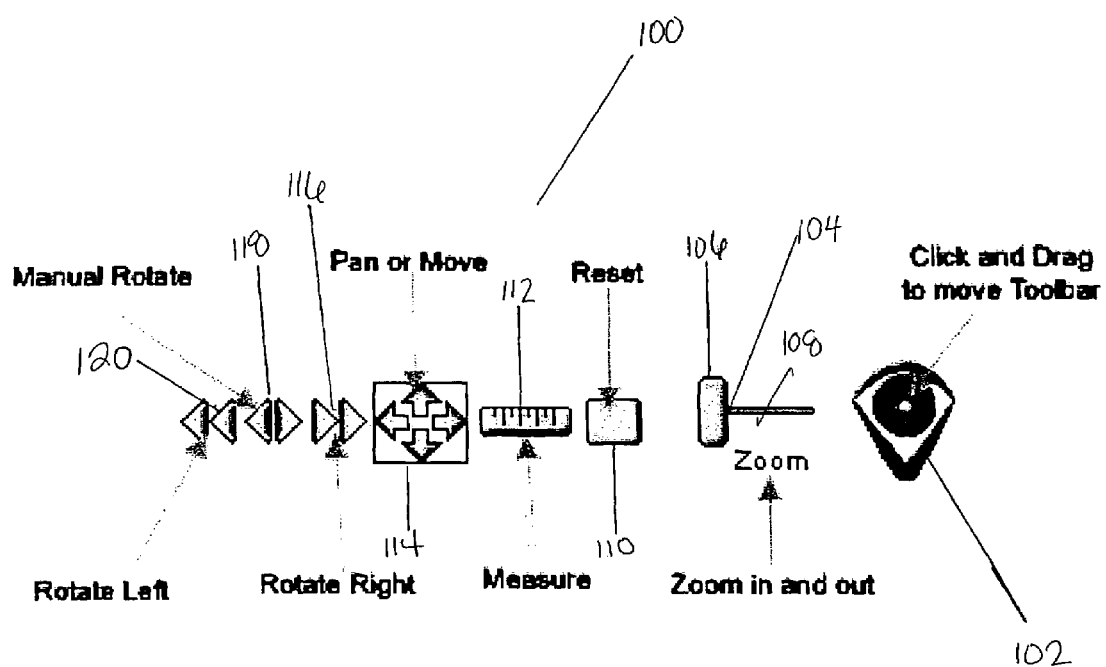
FIG. 7 is a perspective view of a tool bar in accordance with one embodiment of a system according to the present invention.
Figure 8:
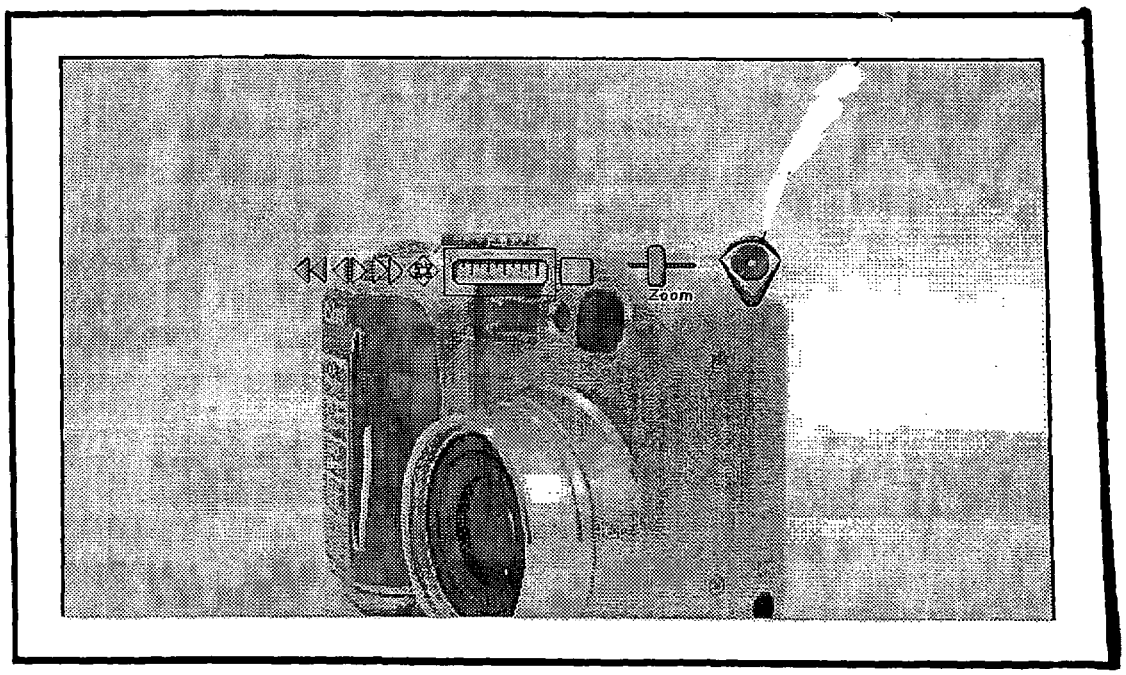
FIG. 8 is a perspective view of a display according to one embodiment of a system according to the invention before a tool bar has been moved.

Some presently contemplated interactive functions according to the system 10 of the invention will now be described more particularly with reference to FIGS. 7-15. Referring now to FIGS. 7 and 8, one possible implementation of a tool bar 100 according to the present invention is shown. In a presently preferred embodiment of the system 10, "buttons" or icons on the tool bar 100 are provided, some of which merely enable certain interactive functions and others of which both enable interactive functions and control, to some degree, how the interactive functions are carried out with respect to the set of images 14.

As one skilled in the art will appreciate, commands can be conveyed to a system by a variety of means, such as via a mouse or a similar device such as a touch screen (e.g., sending commands by moving a finger from point to point on a touch screen display). Commands can be associated with various positions or states of a mouse with respect to a display. For example, commands can be associated with the positions or states of "mouse over" and "mouse click," and, in some systems such as the preferred embodiments of the system according to the present invention, with the positions or states of "mouse up," "mouse down," and "mouse out." The software 20 can be configured such that each one of these commands initiates some corresponding action with respect to the buttons in the tool bar 100.

With reference now to FIG. 7, a tool bar according to a preferred embodiment of the system 10 of the invention is illustrated. From right to left, the buttons on the tool bar 100 illustrated in FIG. 7 correspond to the following interactive functions: (1) the button 102, which can be in the form of a logo (as shown in FIG. 7) (such as, the logo of the provider of the system 10 or the logo of the provider of the web pages), enables the user to use a mouse, or other object that similarly can be used to provide x and y coordinates to the system 10 that correspond locations on the display, to move the tool bar around on the viewable portion of his or her display screen; (2) the button 104, which is comprised of a thumb or knob 106 and a horizontally disposed track 108, enables the user to zoom in on or zoom out of an image 12; (3) the "reset" button 110, which enables the user to return to the whatever first predetermined or selected image layer 200 was originally delivered to the user and in the form in which it was originally delivered (e.g., not zoomed in on); (4) the "measure" button 112, enables the user to use a mouse or similar device to first identify a certain dimension of an object in an image and then to obtain information concerning an actual physical dimension corresponding to that certain dimension; (5) the "pan or move" button 114, which enables the user to use his or her mouse or similar device to pan or move the transparent layer 204, the image layers 200 and, optionally, the tool bar layer 202 from one position to another on the display screen, in any of the horizontal, vertical or diagonal directions; (6) the "rotate right" button 116, which enables the user to cause the currently viewable image layer to change sequentially from among the possible image layers 200a-200p, in order to give the user the illusion of rotational movement in the right direction; (7) the "manual rotate" button 118, which the user to perceive a rotational effect by clicking and dragging a mouse, in one of at least two possible directions (e.g., left or right), over the currently viewable image layer, user to cause the currently viewable image layer to change sequentially from among the possible image layers 200a-200p; and (8) the "rotate left" button 120, which enables the user to cause the currently viewable image layer to change sequentially from among the possible image layers 200a-200p, in order to give the user the illusion of rotational movement in the left direction.

In order to provide the user with a description of the interactive functions with which the buttons on the tool bar correspond, in a preferred embodiment of the system 10 according to the invention, whenever the user clicks on a button or icon on the tool bar 100, a description of how the user can interact with the requested set of images 14 using that button—i.e., the icon's functionality—appears or "pops up" on the display, as is shown in the text boxes of FIG. 7.

Alternatively, when a user first begins use of the system according to the invention, the user might be presented with a look-up table, help menu or other information which describes each of the buttons on the tool bar, so that no prompting of the user is necessary when the "manual rotate" button (or any other button) is activated. Although providing the tool bar to enable the user to initiate the various interactive functions with a requested image is desirable, one of ordinary skill in the art will readily appreciate that other means of enabling a user to commence interactive functions are possible, such as using various combinations of keystrokes on a keyboard coupled to the display, using voice commands coupled to the display, or other signals corresponding to commands coupled to the display.

In still a further alternative embodiment, the tool bar layer 202 as well as all of the image layers 200 except the currently viewable image layer 200 might be kept hidden from view upon delivery of a set of images 14. Instead of immediately displaying the tool bar to the user, another different layer might be made visible together with the currently viewable layer 200 that contains an icon or other symbol that can invoke the tool bar layer 202. That is, when a user moves his or her mouse over the symbol or icon in this tool-bar-invoking layer, the user's action causes the system 10 to make visible the tool bar layer 202 along with the currently viewable layer 200. Alternatively, the tool-bar-invoking layer will be hidden when the tool bar layer 202 and the currently viewable image layer 200 are made visible. Preferably, the tool-bar-invoking layer is sized so as to be smaller than the image layers 200, for example, one tenth of the height and width of the image layers 200, so that the tool-bar-invoking layer, when visible to the user, would not interfere to any significant degree with the user's perception of the currently viewable image layer 200.

Similarly, a feature might be provided in the system 10 according to the invention where the tool bar 100 in the tool bar layer 202 has a button or icon which, when activated by the user by some action such as a mouse over or the like, will cause the tool bar layer 202 to become hidden from the user's field of view and replaced by the tool-bar-invoking layer, such that the user will again perceive only the tool-bar-invoking layer and the currently viewable image layer 200 in his or her field of view at one time. In one presently preferred embodiment of the system 10 according to the invention, where the set of images 14 are delivered and interacted with in conjunction with a banner advertisement on a web page, the "reset" button on the tool bar is used to hide the tool bar from view, such that only the currently viewable layer 200 and the icon in the tool-bar-invoking layer are perceptible by the user. Features such as described above allow users who are familiar with the various interactive functions of the system 10 to hide the tool bar 100 altogether when desired, in order to eliminate the tool bar 100 as a possible distraction on the users' display while the users are perceiving the currently viewable image layer 200.

Some of the interactive functions that are available as options on the tool bar 100 are entirely carried out when the pertinent button or icon on the tool bar is activated, for example, when the user clicks on the button and holds the mouse button down on the autorotate left or autorotate right buttons, the system 10 will cause the currently viewable image layer to cycle through image layer 200a through 200p or through image layer 200a and then through image layers 200p, 200o, etc., respectively. With regard to other of the interactive functions, moving the mouse over, pressing down on the mouse button, or clicking on the button causes the system 10 to be placed in that particular interactive function mode, and the user has to move the mouse with respect to the currently viewable image layer 200 in order to carry out the interactive function, whereby the function performed responds to commands from the mouse corresponding to the coordinates of the mouse on the first transparent layer 204 or on the currently viewable image layer 200. For example, clicking on the "manual rotate" button on the tool bar puts the system 10 in "manual rotate" mode, but in order for the user to perform the manual rotate interactive function, the user has to click on the first transparent layer 204 (which is on top of the currently viewable image layer 200), and drag the mouse in the direction in which the rotational effect is desired (e.g., to the left or to the right).

Figure 9:
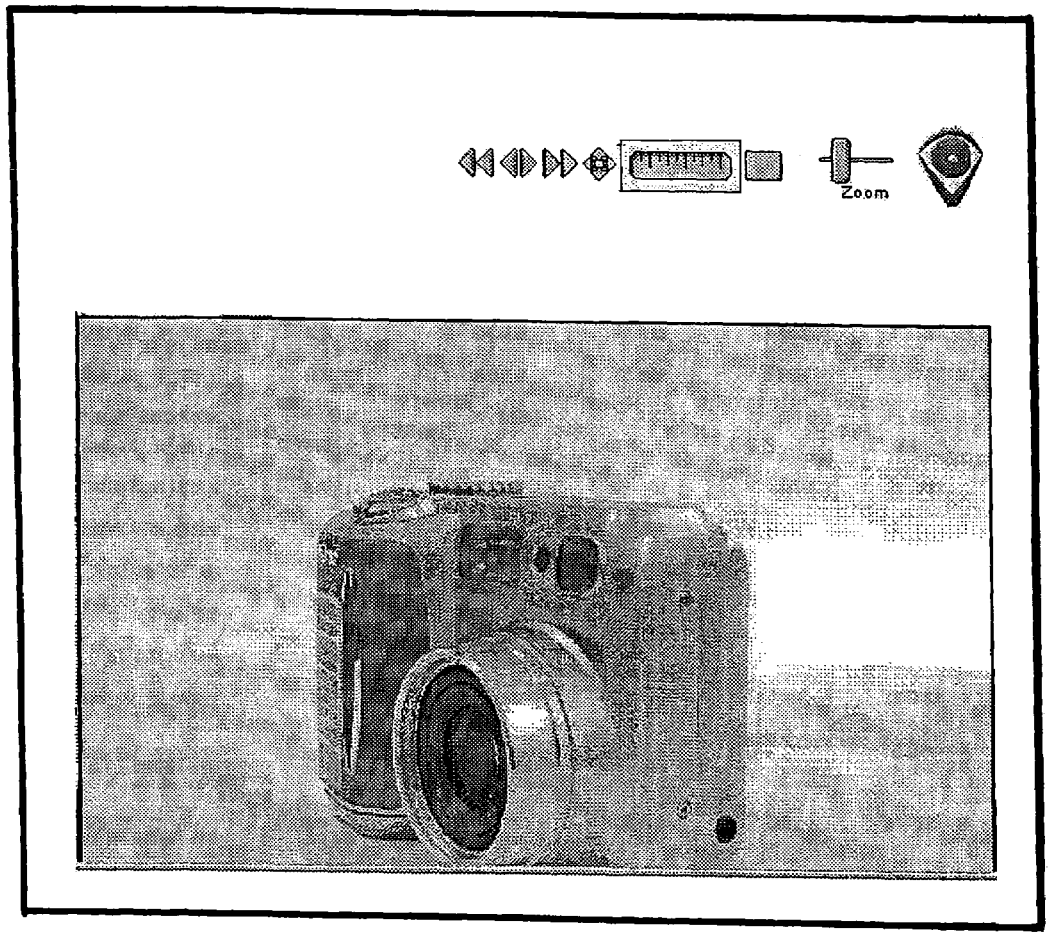
FIG. 9 is a perspective view of a display according to one embodiment of a system according to the invention after a tool bar has been moved.

With regard to the tool bar 100 itself, the system 10 has a feature whereby the user can change the orientation of the tool bar 100 on the user's display. That is, by pressing down a mouse button and/or clicking on a mouse while the mouse is positioned anywhere within the tool bar layer 202, the user can cause the tool bar 100 to be moved anywhere on the user's display, either to a position somewhere within the viewable area in which the currently viewable image layer 200 is being displayed, or completely outside of that viewable area (e.g., beyond the border of that viewable area) so that the tool bar 100 does not interfere with user's ability to perceive the entirety of the currently viewable image layer 200. That is, when the user moves a mouse anywhere within the boundaries of the tool bar layer 202 and presses down on the mouse button and/or clicks using the mouse at coordinates corresponding to $x_1$ and $y_1$, and then drags his or her mouse to another location on the display corresponding to coordinates $x_2$ and $y_2$, the tool bar 100 will be moved from $x_1$, $y_1$ to $x_2$, $y_2$. With reference to FIGS. 8-9, and based upon the difference between $x_1$ and $x_2$, on the one hand, and the difference between $y_1$ and $y_2$, on the other hand, the tool bar 100 will be moved on the display, for example, outside of the field of view of the currently viewable image layer 200 altogether. A button or icon on the tool bar layer might provide a visual cue to a user for the move toolbar function, such as, the button 102, which in the figure happens to be the logo of the provider of the system 10.

The zoom interactive function of the system 10 according to the invention, in particular, reflects several significant advantages over zoom interactive functions of prior art systems. More particularly, the zoom interactive function of the system 10 according to the invention allows a user to perceive a smoothly executed zoom, wherein the size of the viewable area within which the zoom is being performed increases to accommodate the enlarged image, and the dimensions of the currently viewable image layer 200 that is being zoomed in on are adjusted proportionally as the zoom is carried out. Moreover, the resolution of the image 12 in the currently viewable image layer 200 after the zoom remains high, because high resolution images can be delivered to a user with the system 10 according to the invention without any appreciable delay caused by the large amount of data that is associated with the high resolution images.

Figure 10:
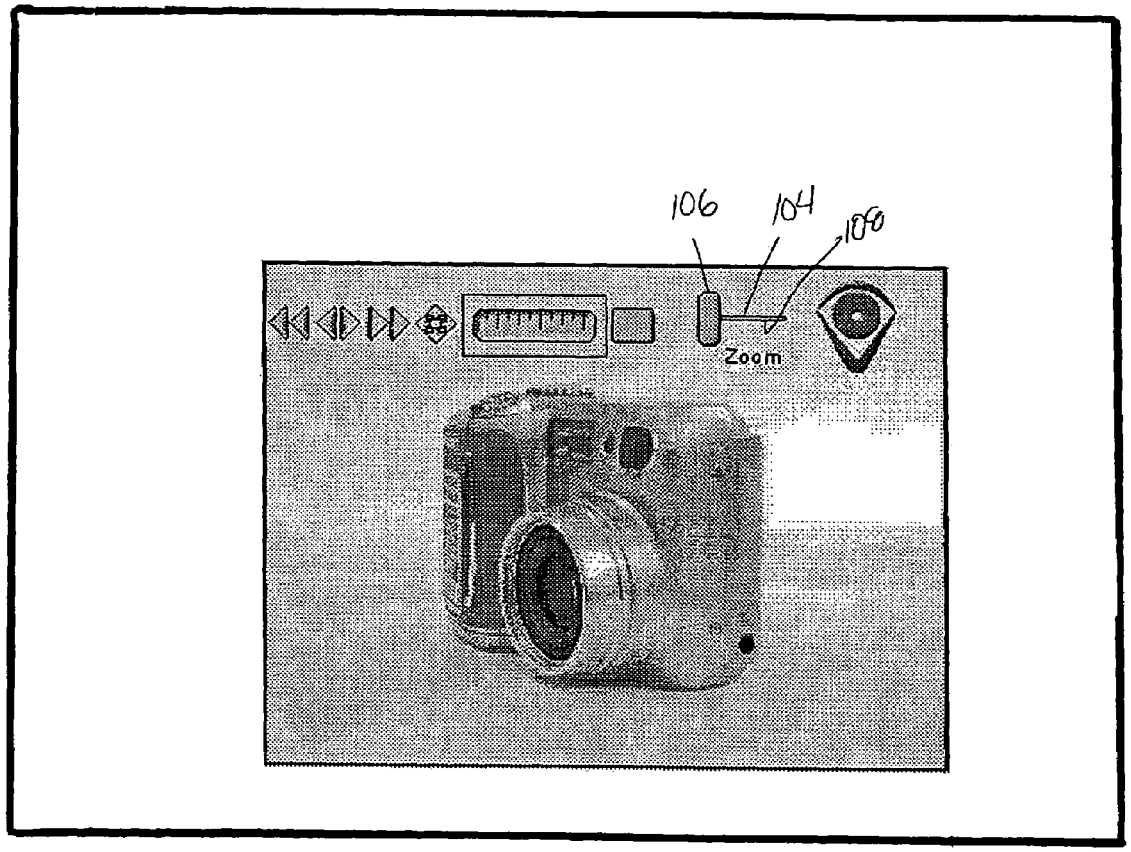
FIG. 10 is a perspective view of a display according to one embodiment of a system according to the invention before a zoom-in function has been performed.
Figure 11:
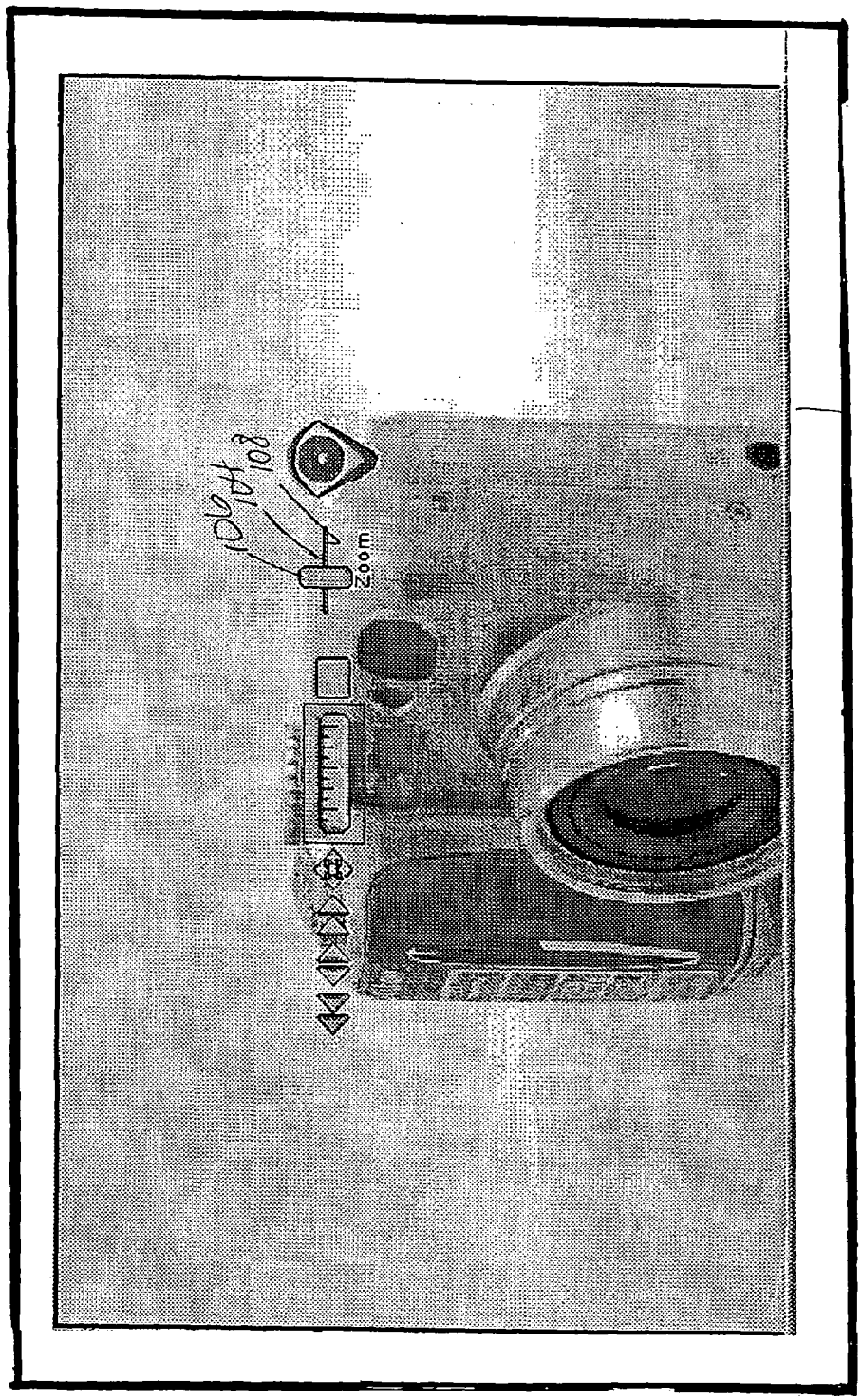
FIG. 11 is a perspective view of a display according to one embodiment of a system according to the invention after a zoom-in function has been performed.

With reference to FIGS. 10-11, the system 10 enables and performs the zoom interactive function according to the following: A predetermined zoom factor, z, for a given set of images is associated with the set of images 14 by the software 20. The zoom factor comprises a limit on the degree to which a particular set of images 14 can be zoomed in on or, alternatively, on how big the object in the set of images 14 can get. Generally, the particular value of the zoom factor, z, is selected so as to optimize the appearance of an object in a set of images 14 when it is zoomed in on, with regard to such factors as how smoothly the zoom function will appear to be carried out (if the image gets too large too quickly, the appearance of the zoom may not be smooth), and how to fix the maximum zoom in to a level that will not distort the images. The zoom factor, z, might be introduced at the time the set of images 14 is introduced to the system 10, or at some later point (e.g., if the set of images 14 is being managed by the webmaster of a third party provider's web site, the webmaster may be able to adjust the zoom factor, z, at any time.) Alternatively, the software 20 may contain a default value for the zoom factor, z, in the event no value for that parameter is otherwise specified by the user (or webmaster).

The zoom interactive function of the system 10 advantageously allows a high resolution image to be perceived by a user upon zooming in on the image. If the set of images 14 consists of only one image 12, for example, in the case where only interactive functions in two dimensions are to be enabled and only with respect to a single image of an object, the image 12 can be delivered rapidly to a user regardless of how high the image resolution is, because no delays will be incurred as might be incurred if the images were delivered using a language such as JAVA (which is typically associated with long delivery times) or additional software such as provided in a plug in.

In cases where the number of images 12 in a set of images 14 is greater than one, for example, when interactive functions are to be enabled in two dimensions for images taken at more than one angle of an object or virtual 3-D interactive functions such as rotation are to be enabled, the quality of the zoom interactive function is not at all compromised by the number of images 12 that compromise the set of images 14. The images 12 in the set of images 14 do not have to be assembled into a single large image file as a precondition to making the images available to the user. Rather, each image 12 in the set of images 14 is provided in its own image layer 200 by the software 20, the resolution of the images being delivered does not have to be sacrificed in order to keep the delivery time to a minimum. Therefore, and since the user perceives the image 12 provided in the predetermined or selected first image layer 200 at the instant of delivery, the user will perceive no delay in delivery time when multiple images, each with relatively high resolution, e.g., 1024×768 pixels, are being delivered. If the maximum available resolution is 1024×768 for any given one of the images 12 in a set of images 14, the original images made viewable to the user (i.e., the non-zoomed-in-on images), can be presented at a resolution of, for example, 320×240 pixels. When a zoom-in interactive function is commanded, and according to the zoom factor, z, the software 20 will reveal more of the available pixels to the viewer as the image is zoomed in on, up to a maximum of 1024×768 pixels in this example. Accordingly, the quality of an image 12 is not compromised at all when a zoom-in interactive function is carried out.

The zoom factor, z, is an arbitrary number, such as five. With reference to FIGS. 10-11, when a user causes the thumb 106 to move from the left to the right along the track 108, the number of pixels the thumb has moved is multiplied by the relevant zoom factor, z, and the image size might increase two-fold or four-fold. When a zoom operation is performed, the zoom interactive function of the system 10 according to the invention not only expands the entire currently viewable image layer 200, but also expands the viewable area within which the currently viewable image layer is displayed to the user. Thus, the user can continue to view the entirety of an object depicted in an image 12 as the currently viewable image layer 200 is enlarged.

In a preferred embodiment of the system 10 according to the invention, when the zoom interactive function is carried out, an associated algorithm adjusts the direction in which the size increase occurs, so as to give the user the illusion that when an object in an image is zoomed in on, it increases in size in all directions equally or proportionately. That is, without such an adjustment, when a zoom in operation is carried out with respect to an image, the image will appear to move down and to the right on the display as it increases in size (i.e., as the height of the image increases the image will increase in size downwardly, and as the width of the image increases the image will move increase in size to the right). With the adjustment of the system 10 according to the invention, as the height of the image increases in size downwardly, the image is immediately shifted back in the opposite direction by half of the increase in height and, similarly, as the width of the image increases in size to the right, the image is immediately shifted back in the opposite direction by half of the increase in width. In this manner, the image appears to increase in size equally in both the directions of height and width.

Figure 13:
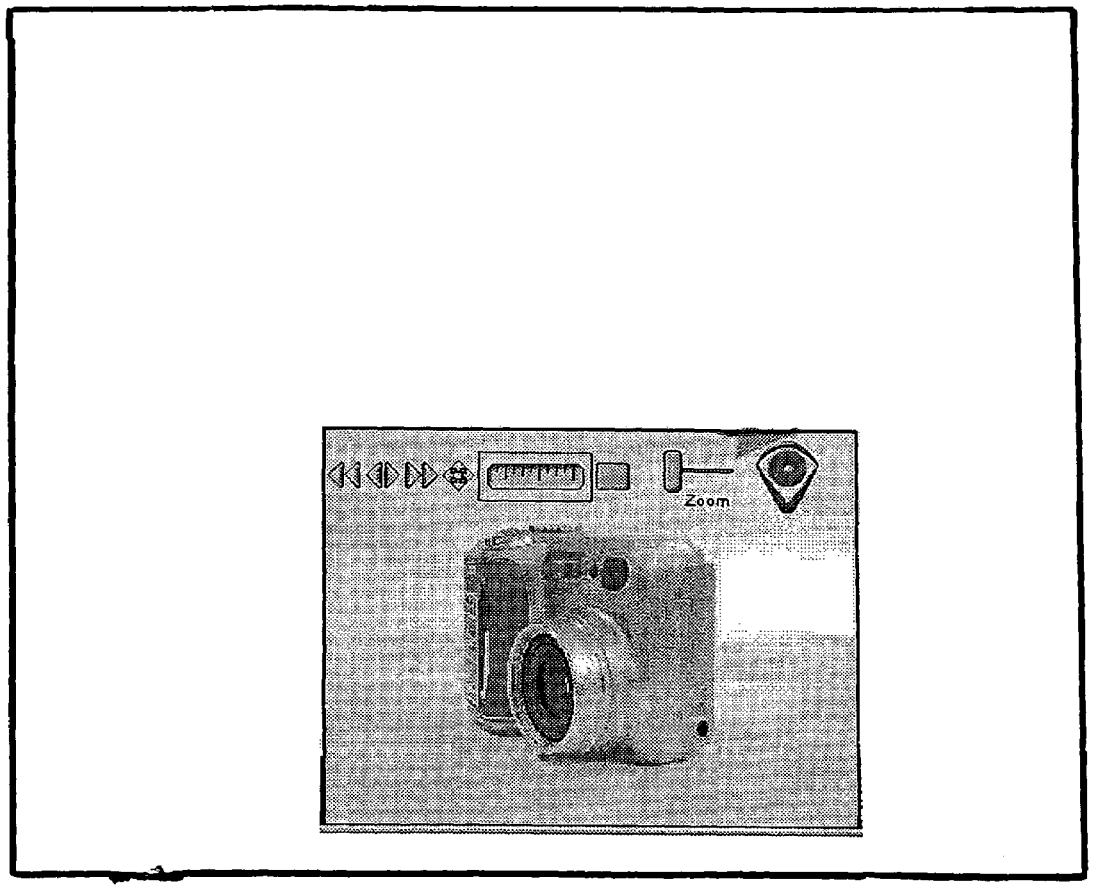
FIG. 13 is a perspective view of a display according to one embodiment of a system according to the invention after a reset function has been performed.

The reset interactive function is carried out entirely when the reset button 110 on the tool bar 100 is clicked on with a mouse or otherwise activated. The reset function causes all of the layers (the image layers 200, the tool bar layer 202, the transparent layers 204, 206 and any tool-bar-invoking layer) to be restored to their original positions, i.e., the positions that all of the layers were in at the time the set of images 14 was first delivered to the user. In the example shown in FIG. 12, the display is illustrated after a tool bar move function has been carried out, such that the tool bar layer 202 is located outside of the field of view of the first transparent layer 204 and the currently viewable image layer 200. With reference to FIG. 13, when the reset interactive function is enabled, and the user clicks anywhere on the object 16 in the currently viewable image layer 200, all of the layers are returned to the position the layers were in at the point of delivery of the set of images 14 to the user, e.g., the image layer 200a will be the currently viewable image layer.

Figure 14:
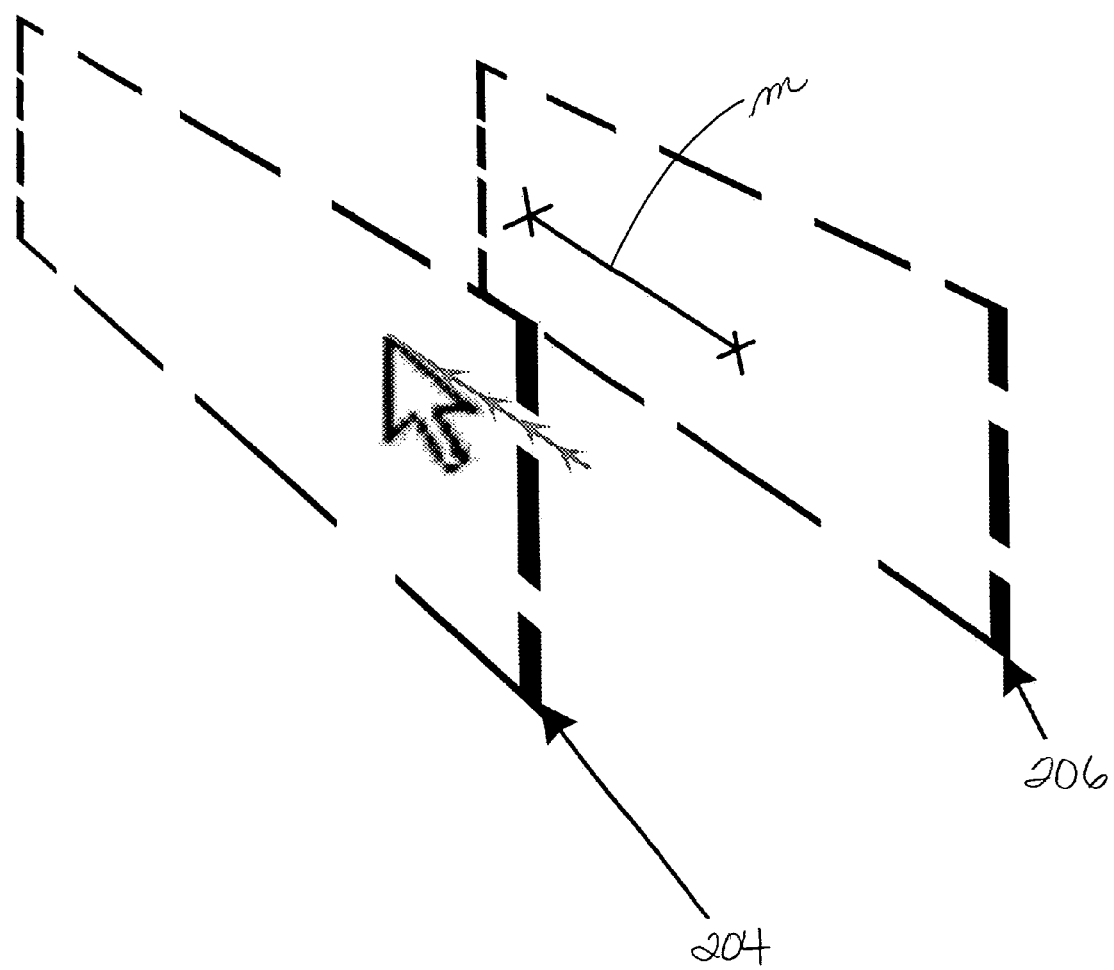
FIG. 14 is a schematic illustration of the relative movement of first and second transparent layers according to one embodiment of the invention, while a measuring function is being performed.
Figure 15:
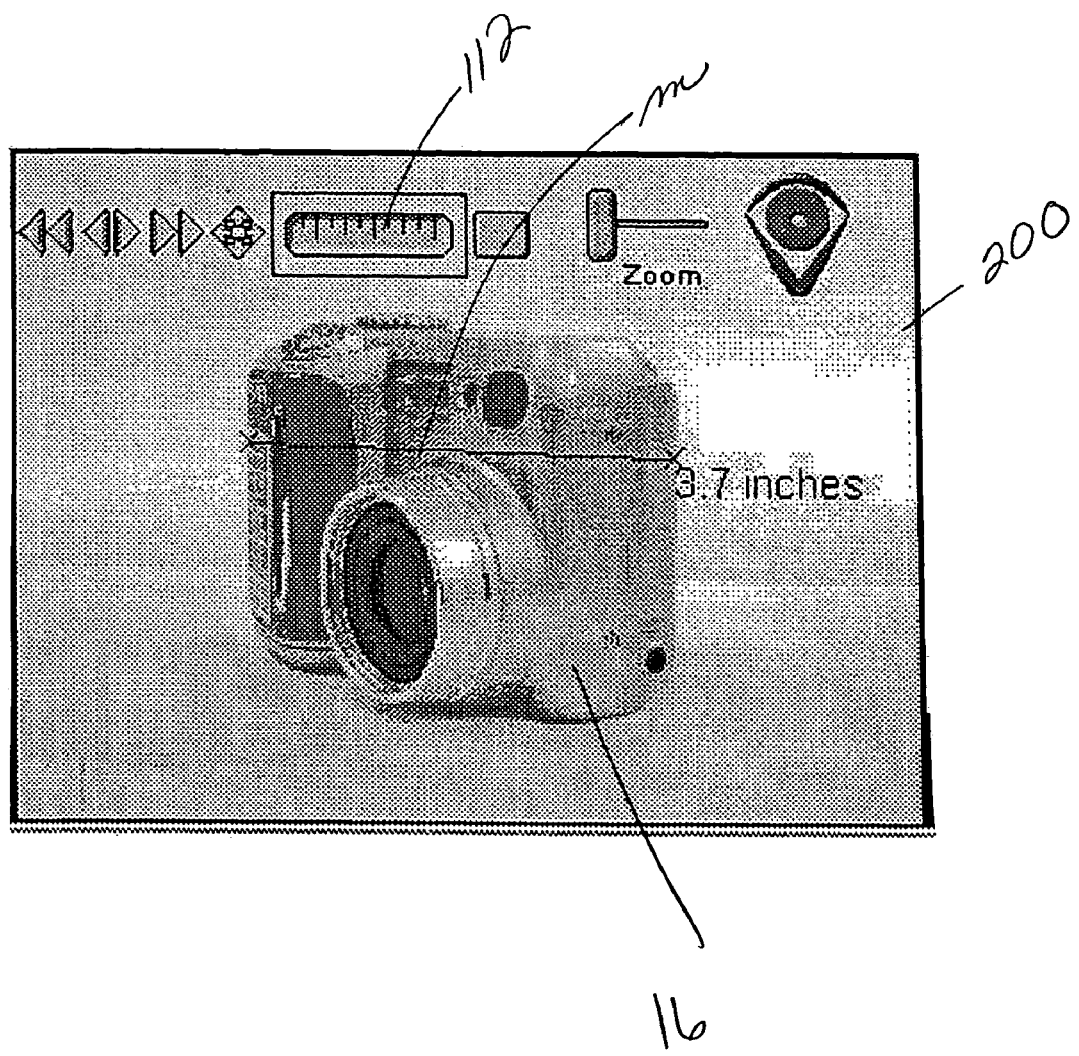
FIG. 15 is a perspective view of a display according to one embodiment of a system according to the invention after a measuring function has been performed.

The measuring interactive function, wherein the second transparent layer 206 has special significance in a presently preferred embodiment of the system 10 according to the invention, will now be described with reference to FIGS. 14 and 15. The system 10 will be put into measuring mode when the user presses down on the mouse button and/or clicks on the button 112 on the tool bar 100 that corresponds to the measuring interactive function. When the user clicks and drags the mouse over one of the dimensions, e.g., height or width, of an object depicted in the currently viewable image layer 200, the first transparent layer 204 will move over the second transparent layer 206, which remains fixed. (When the system 10 according to the invention is in measuring mode, only the first transparent layer 204 will be movable with respect to all of the other layers.) A line, m, will be drawn on the second transparent layer 206 which corresponds to the distance the first transparent layer 204 has moved relative to the second transparent layer 206, i.e., a line corresponding to the coordinates of the mouse position before and after the mouse is dragged, e.g., the starting point when the mouse began to be dragged, $x_1$, $y_1$, and the ending point when the dragging of the mouse is stopped, e.g., $x_2$, $x_2$.

The actual physical value corresponding to the dimension the user measures with the measuring tool can be calculated based on the number of pixels comprising the line m and information about the actual physical dimensions of the object 16 that is known by the system 10. Information about the physical dimensions of the object 16 may be known by the system 10 by reason of the fact such information was input to the system 10 at some point prior to use of the measuring tool, e.g., at the time the set of images 14 was introduced to the system 10. Alternatively, information about the physical dimensions of the object 16 may be known by the system 10 by reason of the fact that information about the dimensions of the space surrounding the object 16 in the images 12 are known to the system 10. For example, if the images 12 are acquired using one of the image-capturing devices 600 described hereinbelow, sufficient information about the actual physical dimensions of the space defined by the interior of the image-capturing device 600 can be introduced to the system 10 from which the actual physical dimensions of an object 16 that is introduced into that space can be calculated by the system software 20.

Figure 16:
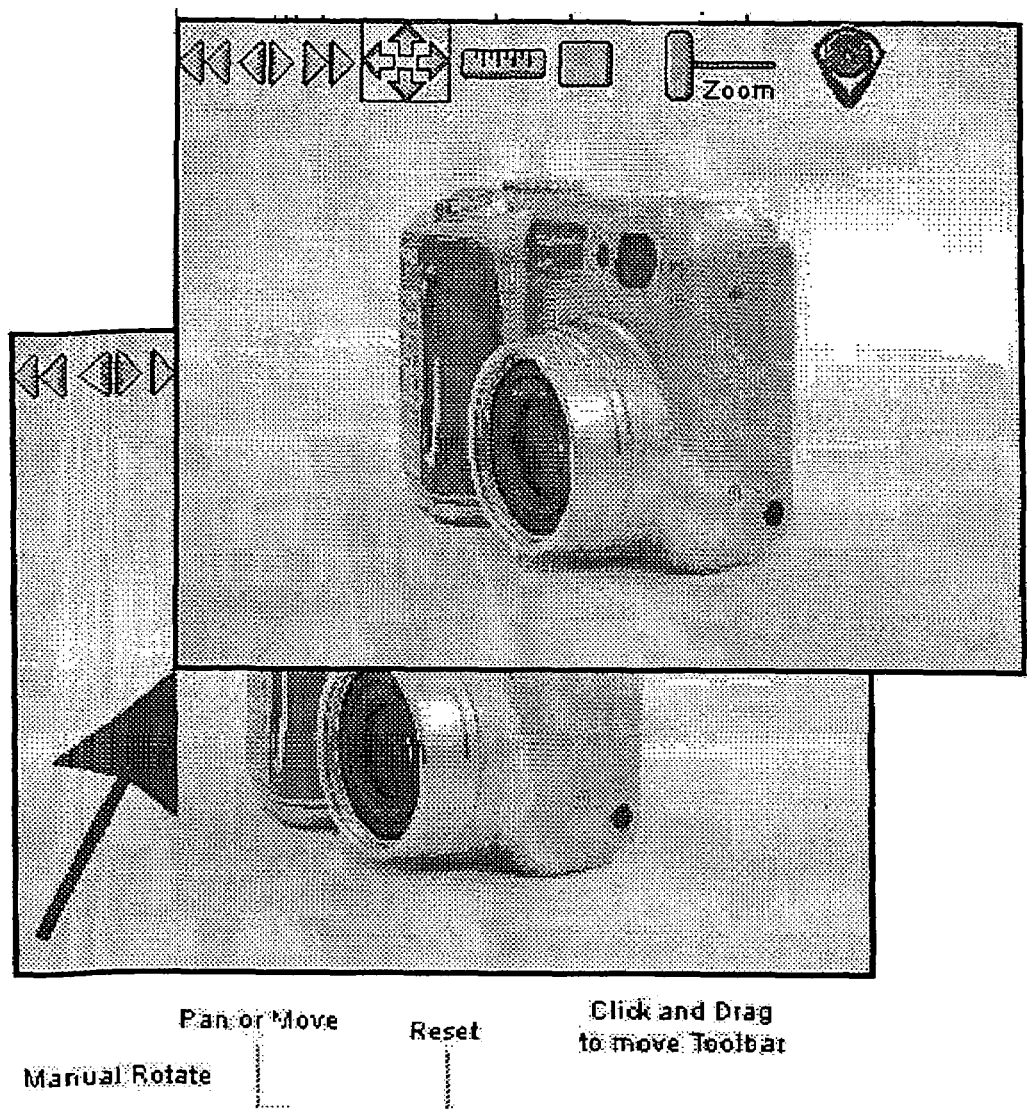
FIG. 16 is a perspective view of a display according to one embodiment of a system according to the invention illustrating the display before and after a move function has been performed.

With regard to the "pan or move" interactive function, in a preferred embodiment this function is carried out, once enabled, according to the difference between a first position of a user's mouse (or similar device providing x and y coordinate information) and a second position of a user's mouse as the mouse is dragged from the first position to the second position. For example, in the coordinates of the mouse on the transparent layer 204 in a first position are $x_1$, $y_1$ and the user drags the mouse from the first position through a line to a second position $x_2$, $y_2$, then the transparent layer 204 together with all of the image layers 200 and, optionally, the tool bar layer 202, will move from the first position to the second position along the line defined by the distance from $x_1$, $y_1$ to $x_2$, $y_2$. For example, and with reference to FIG. 16, if the line corresponds to a diagonal line across the display, then the transparent layer 204 and the image layers 200 will move diagonally. Similarly, if the line corresponds to a horizontal line across the display, then the layers will move horizontally, if the line corresponds to a vertical line across the display, then the layers will move vertically, etc.

With regard to the rotate functions, there are three options with respect to this function in the system 10 according to the that which will now be described as follows:

A user can cause an object depicted in a set of images 14 to appear to rotate enabling one of two "autorotate" functions and/or a "manual rotate" function. With reference to the tool bar 100 shown in FIG. 7, a user may enable an autorotate function in one of two directions, i.e., right or left, by clicking on the appropriate button or icon 116, 120. In the autorotate mode, whichever image layers 200 in the set of images 14 that corresponds to a 360-degree view of an object in a particular plane, q, will be successively, and for a selected increment of time, be made the currently viewable layer. With reference to the example where the object 16 of interest is a camera, there might be sixteen images 12 taken at increments of 22.2 degrees in a particular plane, q, that comprise the set of images 14 for the camera. When the "rotate left" autorotate function is enabled by clicking on the appropriate tool bar button or icon 120, the currently viewable image layer, e.g., the first image layer 200a, will be hidden and the next sequential image layer, e.g., second image layer 200b, will be made the currently viewable image layer. The image layers are cycled through in this fashion, with each respective image layer 200a-200p being made visible to, and subsequently hidden from, the user, at a predetermined or selected increment of time. The image layers 200 will continue to be displayed to the user sequentially, with one of the image layers 200a-200p after another being made the currently viewable image layer and then hidden, until the user disengages the autorotate interactive function (e.g., by letting up on the mouse button over the autorotate button on the tool bar).

Of course, if one of the two autorotate interactive functions (i.e., "autorotate left" or "autorotate right") is engaged by clicking on the appropriate autorotate button 116, 120 on the tool bar 100 at a time when the currently viewable image layer is other than the first image layer 200a, e.g., when the currently viewable image layer happens to be image layer 200h, that currently viewable image layer 200h will be the starting point for the rotational effect. Similarly, if the user disengages the autorotate function (i.e., takes the system 10 out of the autorotate mode, when the currently viewable image layer is somewhere in the middle of the image layers 200 (e.g., on a middle image layer 200g) for the set of images 14, the currently viewable image layer 200 will remain as that middle image layer 200g when the autorotate function is disengaged.

If an autorotation in the opposite direction is desired by the user, then the image layers 200 might be cycled through in the opposite direction, e.g., from the first image layer 200a, to the last image layer 200p, to the next to last image layer 200o, etc. In other preferred embodiments of the system 10 according to the present invention, a user may be able to command rotation of an object 16 depicted in a set of images 14 about 360 degrees in more than one plane, depending on the nature and type of the images 12 that have been acquired for the object 16. For example, if there are sufficient images 12 in the set of images 14, the user could achieve the effect of rotating in a vertical direction (e.g., "rotate top" or "rotate bottom") in addition to the horizontal directions (i.e., "rotate left" or "rotate right").

The "manual rotate" is an alternative to the "autorotate" function for the user to perceive a virtual 3-D effect of an object. Rather than initiating the illusion of rotation by clicking on, or holding the mouse button down on top of, one of the "autorotate" icons on the tool bar, the "manual rotate" function is carried out by a user by first clicking on the "manual rotate" icon 118 on the tool bar 100, and then moving the mouse to a point somewhere in the currently viewable image layer. The user next presses down on the mouse button and drags the mouse in the direction the rotational effect is desired. If the rotational effect is only available about one axis of the object, which is generally the case, then the user might drag the mouse to the right to initiate rotation in that direction, and to the left to initiate rotation of the object to the left. The degree of rotation, i.e., the number of image layers 200 in the set of image layers 200a-200p that sequentially will be made the currently viewable image layer and then hidden, will depend in part on how far the user drags the mouse across the image. The speed at which the relevant ones of the image layers 200a-200p are made currently viewable to, and then hidden from the user, will depend in part on how fast the user drags the mouse across the image. Thus, the user has a greater degree of control over how the rotation interactive function is executed by the system 10 than when the autorotate interactive function is performed. If there are enough images 12 that have been acquired in enough of the possible planes of rotation of the object 16, the manual rotate function could be used to provide a gyroscopic virtual 3-D effect with respect to the object, by causing the object 16 to appear to rotate in multiple planes of the object when the mouse is dragged on the currently viewable image layer 200 in different directions, where each direction corresponds to a different plane of rotation.

For 2-D images, the interactive functions desirably include one or more of the following interactive functions: (1) panning or moving an image layer from place to place on a display; (2) measuring one or more physical dimensions of an object depicted in the currently viewable image layer; (3) zooming into or zooming out on the currently viewable image layer; and (4) a resetting function which resets the tool bar layer, the transparent layer(s) and the image layers to the form in which the appeared at the time the set of images 14 was delivered to the user.

In an alternative embodiment according to the system 10 of the invention, only one image layer 200 might be created for a given set of images 14, whereby the currently viewable image layer 200, e.g., the predetermined or selected one of the images 12 made viewable upon delivery of the web page to the user, or whichever one of the images 12 is made viewable during the performance of an interactive function, is swapped in and out of a single image layer 200. In still other alternative embodiments according to the system 10 of the invention, the tool bar layer 202 and/or the transparent layers 204, 206 might be optional.

Moreover, and although the presently preferred embodiment of the system 10 according to the invention is directed towards applications with third party website providers, other applications are contemplated and are within the scope of the invention, as will be apparent to those skilled in the art. For example, a user may acquire one or more images of an object on their own, such as by taking multiple digital photographs of an object from different angles in a particular 360-degree plane. The user then might upload the acquired images to the website of a provider of the system 10 according to the invention, whereupon the system provider would associate the software 20 with the user's set of images to enable various possible interactive functions, perhaps as selected by the user from among a menu of available interactive functions. The system provider would then deliver the interactivity-enabled set of images back to the user via any suitable means, such as via web pages or on a CD-ROM or other storage device. The user could then use his or her own processor to implement the software 20 and carry out the available interactive functions, for example, in the course of a presentation using the POWERPOINT program available from Microsoft Corporation.

Similarly, a user may be able to obtain the software 20 and associate his or her images with the software 20 directly, using the processor of his or her computer to implement the software 20, so as to enable the images for interactivity. For a more sophisticated user, the software 20 might include prompts for the user to enter certain parameters to tailor the available interactive functions for different sets of images. For a less sophisticated user, the software might include prompts for information that are simpler to follow, such as "upload image #1," "upload image #2," "enter the height of the object in inches," etc.

Additionally, the software 20 can be associated with a set of images 14 that are intended to be delivered to, and interacted with by, users who request the sets of images 14 over an intranet, or who download the sets of images 14 and the software 20 to temporary or permanent memory on their personal computers, PDAs ("Personal Data Assistants"), cell phones or other devices suitably equipped to accept the delivered sets of images 14 and to implement the software 20 with an appropriate processor.

In still other embodiments of the system 10 according to the invention, the same basic principles for the delivery of images and the enabling of interactive functions with respect to those images can be applied, with or without the use of the software 20, to render images on various forms of printed media, such as lenticular sheets, sets of images 14 with which a user can interact so as to perceive the illusion of 2-D or 3-D motion, as is described in more detail hereinbelow.

According to other aspects of the present invention, there are provided systems, including apparatuses and methods, which allow users to control the creation of images of objects of their own choosing which can be processed and displayed by the processing and display system and method described hereinabove. For example, individual, corporate, or government users may be provided with means for acquiring a digital image of a desired object, the digital image being comprised of multiple image files or a single image file, which can then be processed and displayed to a user in a 2-D or 3-D form with which the user can interact in some fashion.

The means for acquiring the digital image desirably comprises scalable, stand-alone machines and devices for the creation of both 2-D and 3-D images of objects (including but not limited to inanimate objects, people and animals). The object for which a digital image is to be acquired would be placed or driven into (e.g., as a car or a truck) inside one of these image-capturing machines or devices. Depending on the size range of the objects for which digital images are to be acquired, the size of the image-capturing device might range from inches-cubed to hundreds of feet-cubed. The maximum and minimum sizes for the image-capturing devices are limited only by the limits of current technology.

In one preferred embodiment according to the present invention, and with reference to FIG. 17*a*-17*b*, an example of an image-capturing device of the system 10 according to the invention is shown. The image-capturing device 600 has an approximately cylindrical barrel 602, having a top surface 604 and a bottom surface 606. A lid 607 is provided, with or without a hinge, in order to allow an object 16 to be imaged to be introduced to the interior of the enclosure formed by the cylindrical barrel and the top surface and the bottom surface.

The image-capturing device 600 is configured to allow a plurality of images to be captured of the object 16. Preferably, in order to minimize the complexity of the design and construction of the image-capturing device 600, and to minimize the number of moving parts required, the object 16 remains stationary while the image-capturing process occurs. A plurality of cameras or lenses 610 are disposed at regular intervals in the interior of the enclosure, preferably about a circumference of the cylindrical barrel 602. A platform 608 optionally is provided in the interior above or on top of the bottom surface 606 on which the object 16 to be imaged can be oriented. The platform 608 can be provided with markings, such as grid marks, to assist in orienting the object 16 such that it is placed at the appropriate focal length for the plurality of cameras or lenses 610. Multiple lenses 610 can be connected to a single camera or other imager or device for acquiring images.

A user can specify the number of images to be captured of the object 16 by interfacing with the image-capturing device 600 via an appropriate control device, such as a touch screen or keypad 612 that is associated with a processor that sends commands to and, optionally, receives data from, the image-capturing device 600. A display also can be provided exterior to the image-capturing device 600, such as on the outer surface of the cylindrical barrel 602 or on an adjacent stand or table, which is in communication with the interior of the image-capturing device 600. A user therefore might observe the object while the images are being captured, or be able to view each image after it is captured, for example, to determine whether the quality of the image is satisfactory or whether the image should be re-taken. In the case where a user desires only a 2-D image, the touch screen or keypad 612 or other comparable device might be provided to enable the user to preview different possible angles at which images of the object might be captured. When the user selects an angle, the processor will command the appropriate camera or lens 610 to acquire the image from the desired angle.

The processor can also be used to configure the captured images in a form that can be output to the user, e.g., on a disk, a CD-ROM, or via a physical or wireless connection to a user's computer or other device capable of receiving the captured images. Alternatively, the processor can also be used to configure the captured images in a form that can be output to the user on some form of printed medium, such as a lenticular sheet or lenticular sheet assembly as is described hereinbelow. The processor further can be configured to associate the captured images directly with the software 20 that later can be implemented by a user's computer or other processor, or other device capable of rendering the images in printed form, such as a printer.

Desirably, the image-capturing device 600 is provided with one or more features that are intended to minimize the degree to which the captured images requiring editing as a prerequisite to carrying out interactive functions (e.g., a virtual 3-D effect) with respect to the images. For example, appropriate lighting is built in to the image-capturing device 600, so that the interior can be optimally illuminated for image capture. Alternatively, lighting can be introduced into the interior from an external source through the opening defined by the lid, through some other opening created for the purpose of introducing light or the like. Lighting of different quality can be offered as an option to a user, for example, when the use of higher quality lighting would make the process of image capture more expensive to a user than when less quality lighting is used. The mechanical aspects of the cameras or lenses 610 and/or lighting can be hidden or partially hidden with respect to the interior of the image-capturing device 600 by covering the lenses and/or lighting with an opaque material or can otherwise be made opaque, so the mechanical parts of the cameras or lenses 610 will not be seen in the captured images. The interior of the image-capturing device 600 also can be made uniform in color, such as white, so as to optimize isolation of the object 16 for image capture. The bottom surface 606 or platform 608 on which the object 16 is positioned for image capture can be made transparent, to prevent the surface or platform from interfering with image capture and, optionally, to allow images to be taken of the object from below the object.

In a presently preferred embodiment of an image-capturing device 600 of the system 10 according to the invention, all of the images to be captured of an object 16 are captured simultaneously, with one image being captured by each of the plurality of lens 610. Thus, the time associated with the process of capturing a plurality of images of an object at different angles, but at approximately the same focal length, is optimized. Alternatively, such as the case in which multiple lenses 610 are connected to a single camera or imager, each image of the object 16 might be captured sequentially by the lenses 610, but with an imperceptible delay between the time each image of the object is acquired.

Depending on the desired level of interactivity with the captured images, fewer images of an object 16 may be captured than there are cameras or lenses 610 in the image-capturing device 600. For example, an image-capturing device 600 may be equipped with sixteen cameras or lenses 610, where sixteen images is a satisfactory number of images to take of an object when a virtual 3-D effect, e.g., providing the illusion of rotation of the object, is desired. Only one image might be optimal if only 2-D interaction is to be enabled. Preferably, the number of images to be captured of an object 16 placed in the interior of the image-capturing device 600 can be determined by the user and communicated to the image-capturing device 600 via the touch screen 612, however, other suitable means of communicating this information will be apparent to one of skill in the art. A user may be able to provide the image-capturing device 600 with other information concerning the object for which images are captured. For example, the user may provide dimensional information, e.g., the height, width and depth of an object in inches or centimeters. An algorithm in the software 20 later during an interactive measuring function by using a ratio of the actual physical dimensions to the corresponding dimensions measured in pixels in the image. Alternatively, information concerning the physical dimensions of the interior of the image-capturing device 600 and the positioning of the lenses 610, etc., can be used by the software 20 to calculate a given physical dimension of an object based upon the number of pixels the dimension comprises in an image.

In alternative embodiments of the image-capturing device 600 of the system 10 according to the invention, means can be provided for moving the object 16 relative to one or more cameras or lenses 610, such as a turntable disposed in the interior of the image-capturing device. In still other alternative embodiments of the image-capturing device 600 of the system 10 according to the invention, means could be provided for moving one or more cameras or lenses 610 disposed in the enclosure defined by the image-capturing device 600 relative to an object 16 that is kept stationary.

Other embodiments of an image-capturing device 600 of the system 10 according to the invention will now be described with reference to FIGS. 18-23.

Figure 18:
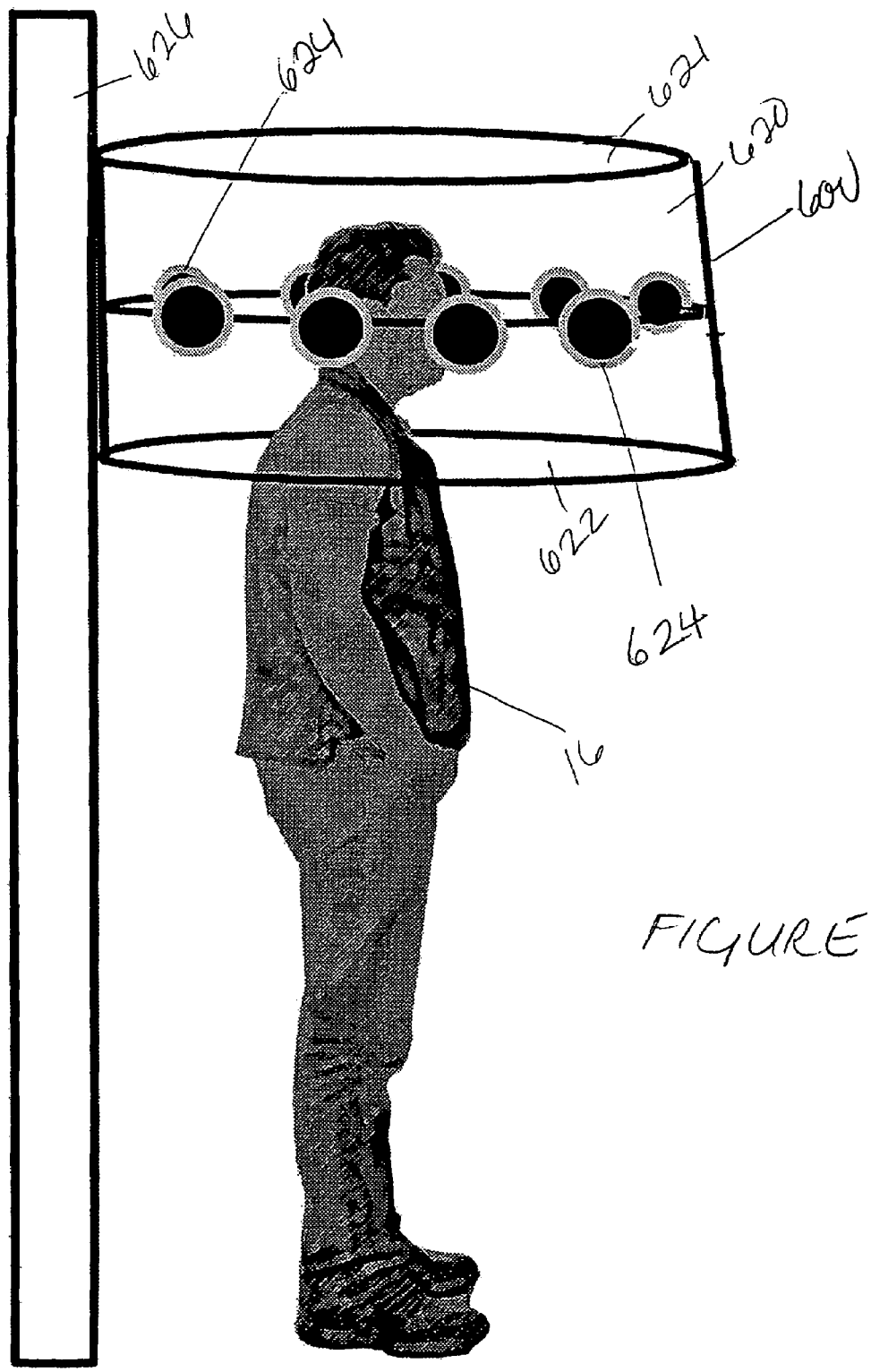
FIG. 18 is an elevational view of an image-capturing device according to another embodiment of a system according to the invention.

With reference to FIG. 18, the image-capturing device 600 would be sized to enable a set of images to be taken of a person's head or head and shoulders, for example, for use with some form of security or identification system. The image-capturing device 600 again has an approximately cylindrically-shaped barrel 620, but the top 621 and bottom 622 of the cylindrically-shaped barrel 620 are left apertured and uncovered.

Figure 17:
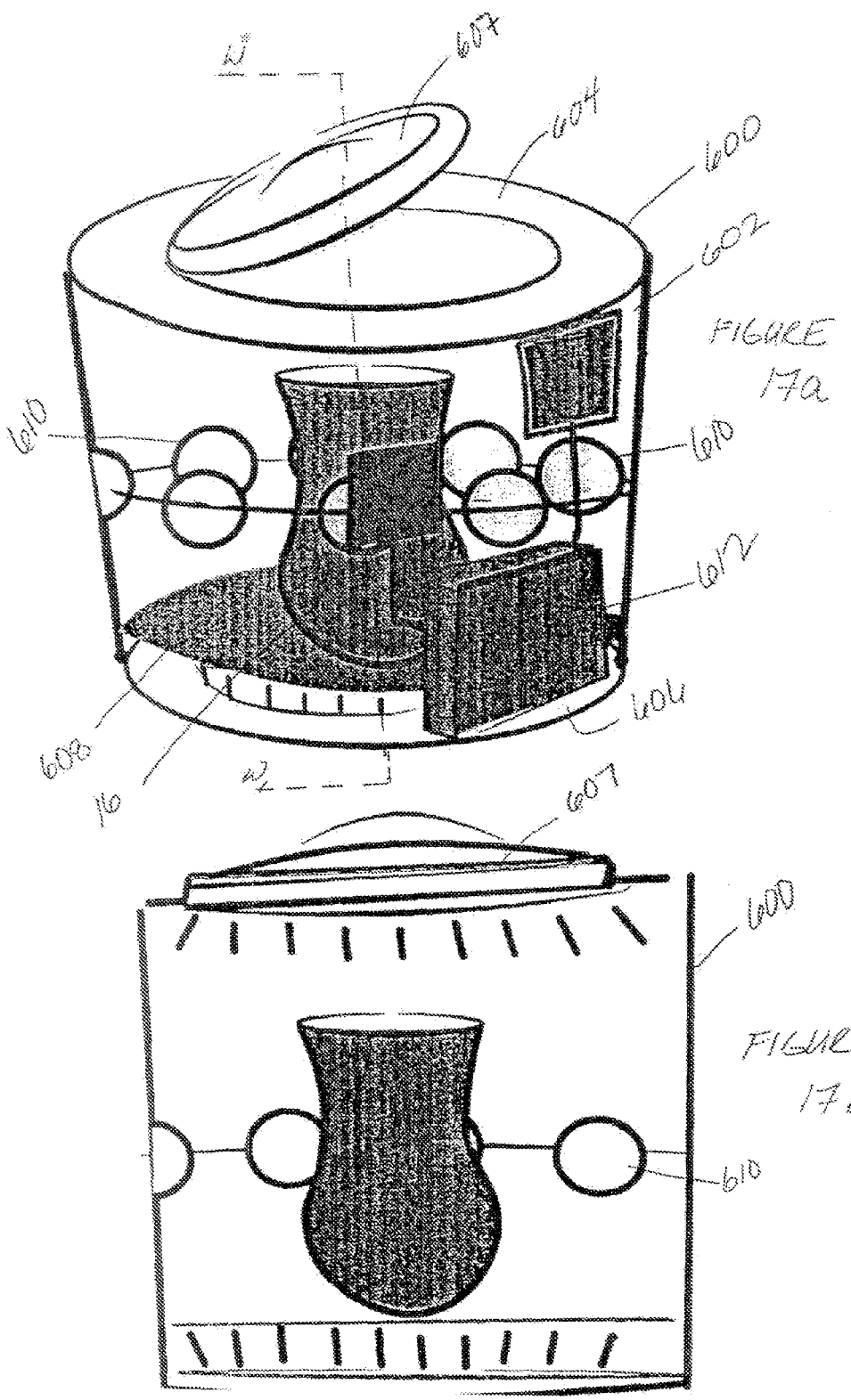
FIG. 17a is an elevational view of an image-capturing device according to one embodiment of a system according to the invention.
FIG. 17b is a cross-sectional view of the image-capturing device of FIG. 17a, taken along the line w-$w_1$.

As was the case with the image-capturing device 600 shown in FIG. 17, the image-capturing device 600 of FIG. 18 is configured to allow a plurality of images to be captured of the object 16 that is placed inside the cylindrically-shaped barrel 620, which in this case is intended to be a person. Preferably, in order to minimize the complexity of the design and construction of the image-capturing device 600, and to minimize the number of moving parts required, the person will be instructed to remain stationary while the image-capturing process occurs. A plurality of cameras or lenses 624 are disposed at regular intervals about a circumference of the cylindrical barrel 620. Optionally, a platform might be provided at the subject's feet in order to guide the person where to stand so as to keep his or her head and shoulders at the appropriate focal length with respect to the lenses 624. Preferably, the cylindrically-shaped barrel 620 is provided on an adjustable pole 626, oriented roughly perpendicular to the cylindrically-shaped barrel 620, so that the cylindrically-shaped barrel 620 can be moved or moved up and down the pole to accommodate subjects of different heights, and subjects can orient properly orient themselves with respect to the cylindrically-shaped barrel 620 without having to bend or stoop.

Desirably, the image-capturing device 600 shown in FIG. 18 is also provided with one or more features that are intended to minimize the degree to which the captured images requiring editing as a prerequisite to carrying out interactive functions (e.g., a virtual 3-D effect) with respect to the images. For example, appropriate lighting can be built in to the image-capturing device 600, so that the interior can be optimally illuminated for image capture. (Generally, appropriate lighting would be lighting that is suitable for the overall size of the image-capturing device and the scale of the objects to be imaged (e.g., different lighting requirements would be appropriate for large objects such as vehicles, boats or aircraft than would be appropriate for items of a microscopic scale).)

Alternatively, lighting can be introduced from an external source, such as lighting directed through the top opening 621 and/or the bottom opening 622. Lighting of different quality can be offered as an option to a user, for example, when the use of higher quality lighting would make the process of image capture more expensive to a user than when less quality lighting is used. The mechanical aspects of the cameras or lenses 624 and/or lighting can be hidden or partially hidden with respect to the interior of the image-capturing device 600 by covering the lenses and/or lighting with an opaque material or can otherwise be made opaque, so the mechanical parts of the cameras or lenses 624 will not be seen in the captured images. The interior of the image-capturing device 600 also can be made uniform in color, such as white, so as to optimize isolation of the object 16 for image capture.

The image-capturing device 600 illustrated in FIG. 18 optionally can be provided with means for controlling certain aspects of the image-capturing process, such as the number of images to be captured. A touch screen or key pad or other suitable device for delivering commands to the image-capturing device either can be provided on a surface of the image-capturing device 600 or can be otherwise coupled to it. Depending on the desired level of interactivity with the captured images, fewer images of an object 16 may be captured than there are cameras or lenses 624 in the image-capturing device 600. For example, an image-capturing device 600 may be equipped with sixteen cameras or lenses 624, where sixteen images is a satisfactory number of images to take of an object when a virtual 3-D effect, e.g., providing the illusion of rotation of the object, is desired. Only one image might be optimal if only 2-D interaction is to be enabled.

Figure 19:
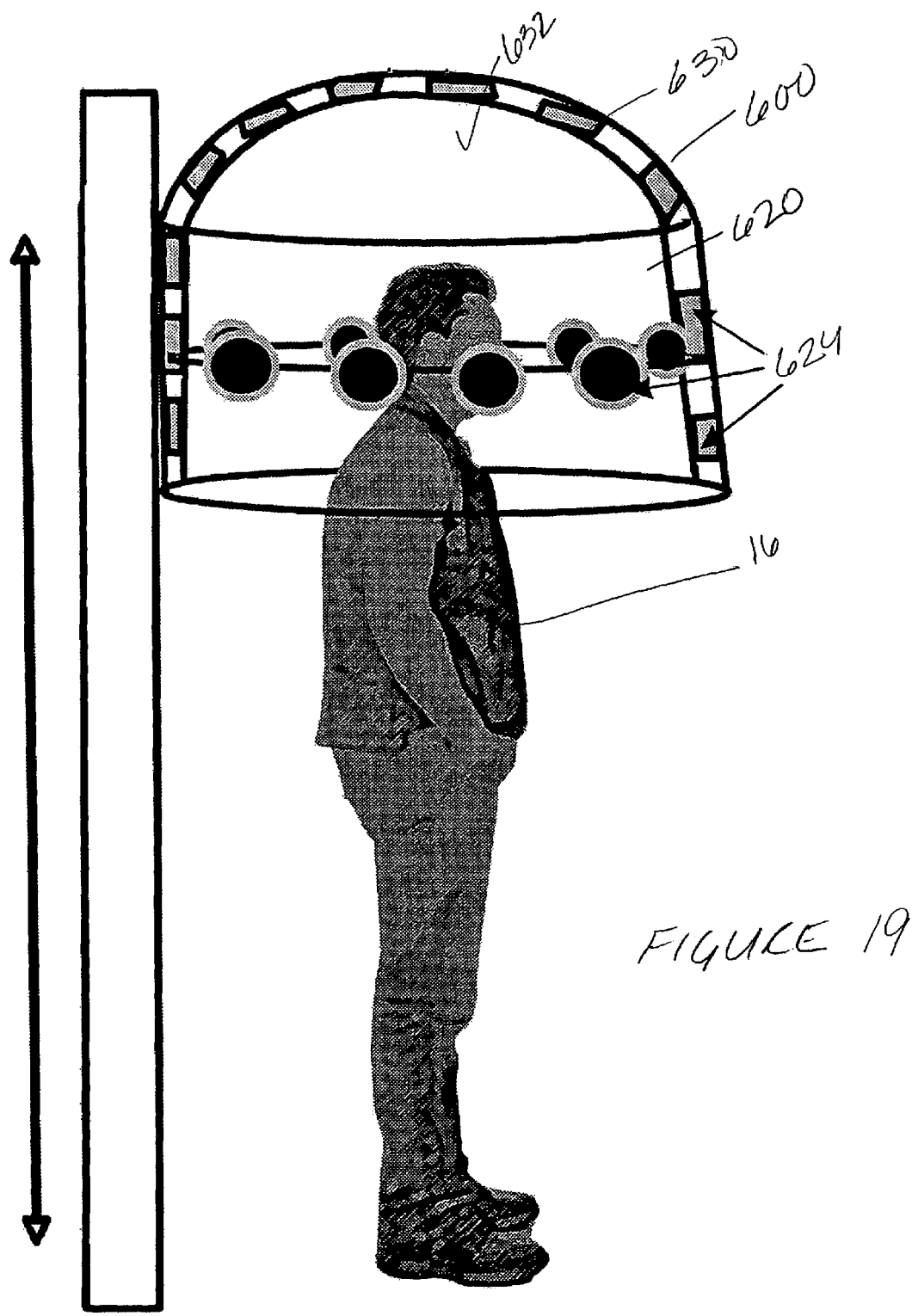
FIG. 19 is an elevational view of an image-capturing device according to another embodiment of a system according to the invention.

With reference now to FIG. 19, the image-capturing device 600 of FIG. 18 can further be provided with a top cover 630 disposed over and covering top opening 621. The top cover 630 may be curved, with a semicircular cross section. The cover can be provided with one or more additional cameras or lenses 624 to enable images to be captured from still other angles of a person's head and shoulders, such as angles that will capture the top of a person's head. The cover also will help minimize the editing required of the captured images later on, by helping to isolate the person's head and shoulders during image capture. The interior surface 632 of the top cover 630 preferably is uniform in color, such as all white, or all off-white, in order to further enhance image capture.

In an alternative embodiment, an image-capturing device 600 similar in appearance to the image-capturing device 600 shown in FIG. 18 could be configured so that the cylindrically-shaped barrel 620 moves relative to the subject, whereby one or more cameras or lenses disposed in the interior of the cylindrically-shaped barrel 620 moves relative to the subject, who would remain stationary, during the image-capturing process. A person-sized image-capturing device also could be provided in which the cylindrically-shaped barrel containing one or more cameras or lenses remains stationary while the subject rotates before the camera(s) or len(ses) on a rotatable platform or stool.

Figure 20:
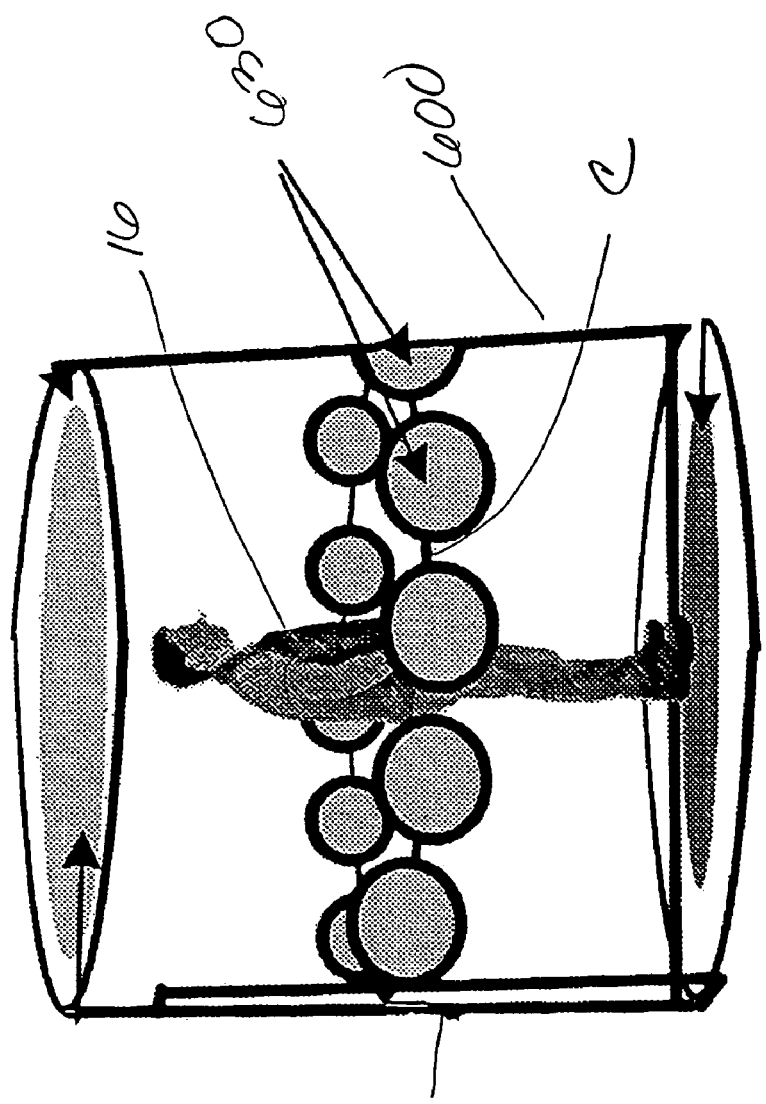
FIG. 20 is an elevational view of an image-capturing device according to another embodiment of a system according to the invention.

There are virtually no limits, other than the limits imposed by currently available technology, as to how large or how small an image-capturing device 600 can be. An image-capturing device 600 is shown in FIG. 20 that can accommodate an entire person's body, or any similarly-sized animal or object. Multiple cameras or lenses 630 are disposed about an inner circumference, c, of the image-capturing device 600 so as to capture images of whatever object is placed in the image-capturing device 600 from a variety of different angles. A door 634 can be provided to allow ingress and egress from the interior of the image-capturing device 600 in order to place objects inside and then remove the objects after the image capture process has been completed.

Likewise, an image-capturing device 600 of the system 10 according to the invention can be designed to have virtually any shape other than cylindrical, although cylindrical or spherical shapes are presently preferred when the images to be captured are to be used in connection with a virtual 3-D type of interactive effect.

Figure 21:
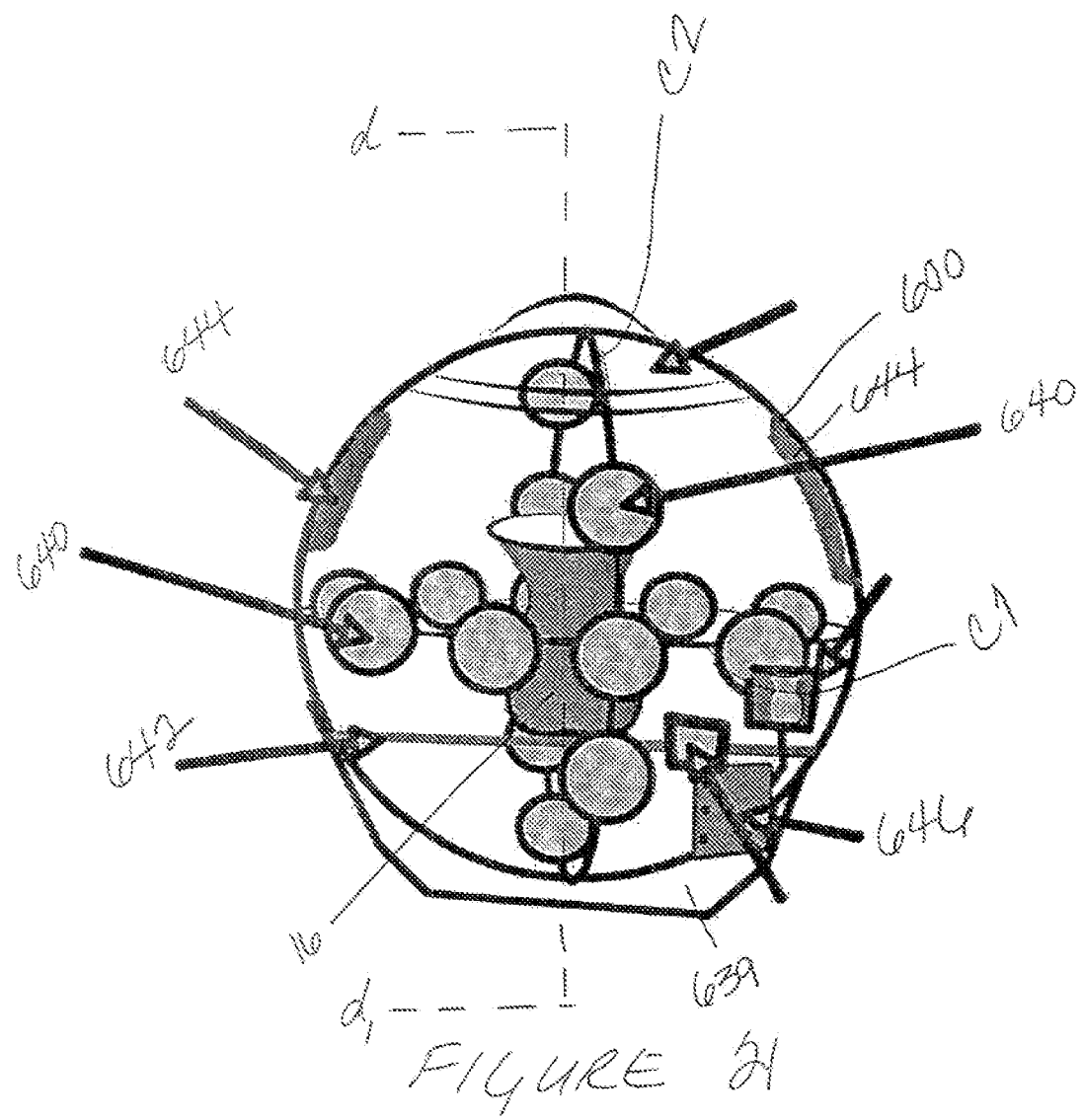
FIG. 21 is an elevational view of an image-capturing device according to another embodiment of a system according to the invention.
Figure 22:
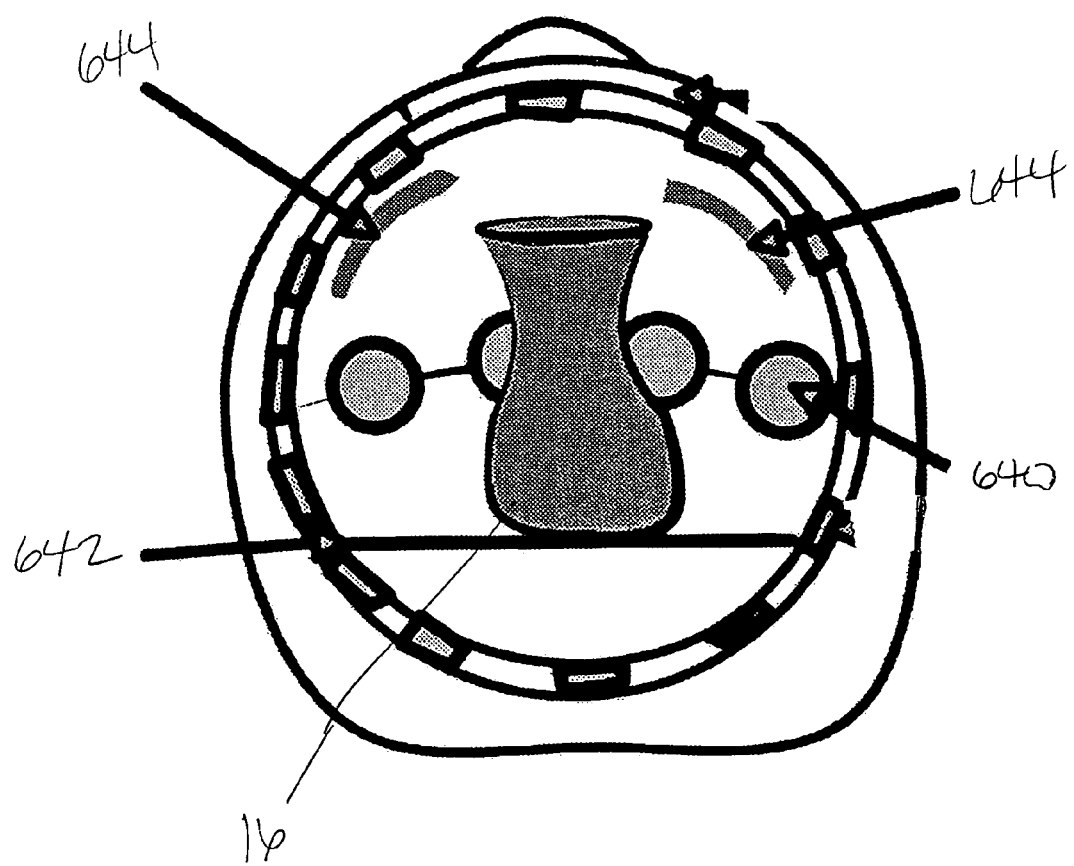
FIG. 22 is a cross-sectional view of the image-capturing device of FIG. 21, taken along the line d-$d_1$.

The image-capturing device 600 illustrated in FIGS. 21-22 is generally spherical in shape, with a non-spherical base 639 to keep the image-capturing device 600 stable with respect to the surface on which it is used. The image-capturing device 600 is provided with multiple cameras or lenses 640 disposed about more than one inner circumference of the image-capturing device 600, such a first inner circumference, $c_1$, and a second inner circumference, $c_2$. A transparent platform 642 might be provided on which to place an object 16 and to allow images to be captured from above and below the object 16. Optionally, the transparent platform 642 might be capable of rotation about a central axis thereof. Lighting 644 may be provided in the interior of the image-capturing device 600 to facilitate image capture and to enhance the quality of the images obtained.

A user can specify the number of images to be captured of the object 16 by interfacing with the image-capturing device 600 via an appropriate control device, such as a touch screen or keypad 646. A display also can be provided exterior to the image-capturing device 600, such as on an adjacent stand or table, which is in communication with the interior of the image-capturing device 600. A user therefore might observe the object while the images are being captured, or be able to view each image after it is captured, for example, to determine whether the quality of the image is satisfactory or whether the image should be re-taken.

Desirably, the image-capturing device 600 is provided with one or more features that are intended to minimize the degree to which the captured images requiring editing as a prerequisite to carrying out interactive functions (e.g., a virtual 3-D effect) with respect to the images. For example, appropriate lighting is built in to the image-capturing device 600, so that the interior can be optimally illuminated for image capture. Alternatively, lighting can be introduced into the interior from an external source through an opening created for the purpose of introducing light or the like. Lighting of different quality can be offered as an option to a user, for example, when the use of higher quality lighting would make the process of image capture more expensive to a user than when less quality lighting is used. The mechanical aspects of the cameras or lenses 640 and/or lighting can be hidden or partially hidden with respect to the interior of the image-capturing device 600 by covering the lenses and/or lighting with an opaque material or can otherwise be made opaque, so the mechanical parts of the cameras or lenses 640 will not be seen in the captured images. The interior of the image-capturing device 600 also can be made uniform in color, such as white, so as to optimize isolation of the object 16 for image capture.

In a presently preferred embodiment of an image-capturing device 600 of the system 10 according to the invention, all of the images to be captured of an object 16 are captured simultaneously, with one image being captured by each of the plurality of lens 640. Thus, the time associated with the process of capturing a plurality of images of an object at different angles, but at approximately the same focal length, is optimized. Alternatively, such as the case in which multiple lenses 640 are connected to a single camera or other imager, each image of the object 16 might be captured sequentially by the lenses 640, but with an imperceptible delay between the time each image of the object is acquired.

Depending on the desired level of interactivity with the captured images, fewer images of an object 16 may be captured than there are cameras or lenses 640 in the image-capturing device 600. For example, an image-capturing device 600 may be equipped with thirty-two cameras or lenses 640, where sixteen cameras or lenses 640 are disposed at regular, predetermined or selected intervals about the first circumference, $c_1$, of interior of the spherically-shaped image-capturing device 600, and another sixteen cameras or lenses 640 are disposed at regular, predetermined or selected intervals about the second circumference, $c_2$, of the interior. Sixteen images about each of the first and second circumferences $c_1$, $c_2$ generally is a satisfactory number of images to take of an object when a virtual 3-D effect of providing the illusion of rotation of the object about two different axes is desired. Only one image might be optimal if only 2-D interaction is to be enabled.

Preferably, the number of images to be captured of an object 16 placed in the interior of the image-capturing device 600 can be determined by the user and communicated to the image-capturing device 600 via the touch screen 646, however, other suitable means of communicating this information will be apparent to one of skill in the art. A user may be able to provide the image-capturing device 600 with other information concerning the object for which images are captured. For example, the user may provide dimensional information, e.g., the height, width and depth of an object in inches or centimeters. An algorithm in the software 20 later during an interactive measuring function by using a ratio of the actual physical dimensions to the corresponding dimensions measured in pixels in the image. Alternatively, information concerning the physical dimensions of the interior of the image-capturing device 600 and the positioning of the lenses 640, etc., can be used by the software 20 to calculate a given physical dimension of an object based upon the number of pixels the dimension comprises in an image.

In alternative embodiments of the image-capturing device 600 of the system 10 according to the invention, means can be provided for moving the object 16 relative to one or more cameras or lenses 640, such as a turntable disposed in the interior of the image-capturing device. In still other alternative embodiments of the image-capturing device 600 of the system 10 according to the invention, means could be provided for moving one or more cameras or lenses 640 disposed in the enclosure defined by the image-capturing device 600 relative to an object 16 that is kept stationary.

Figure 23:
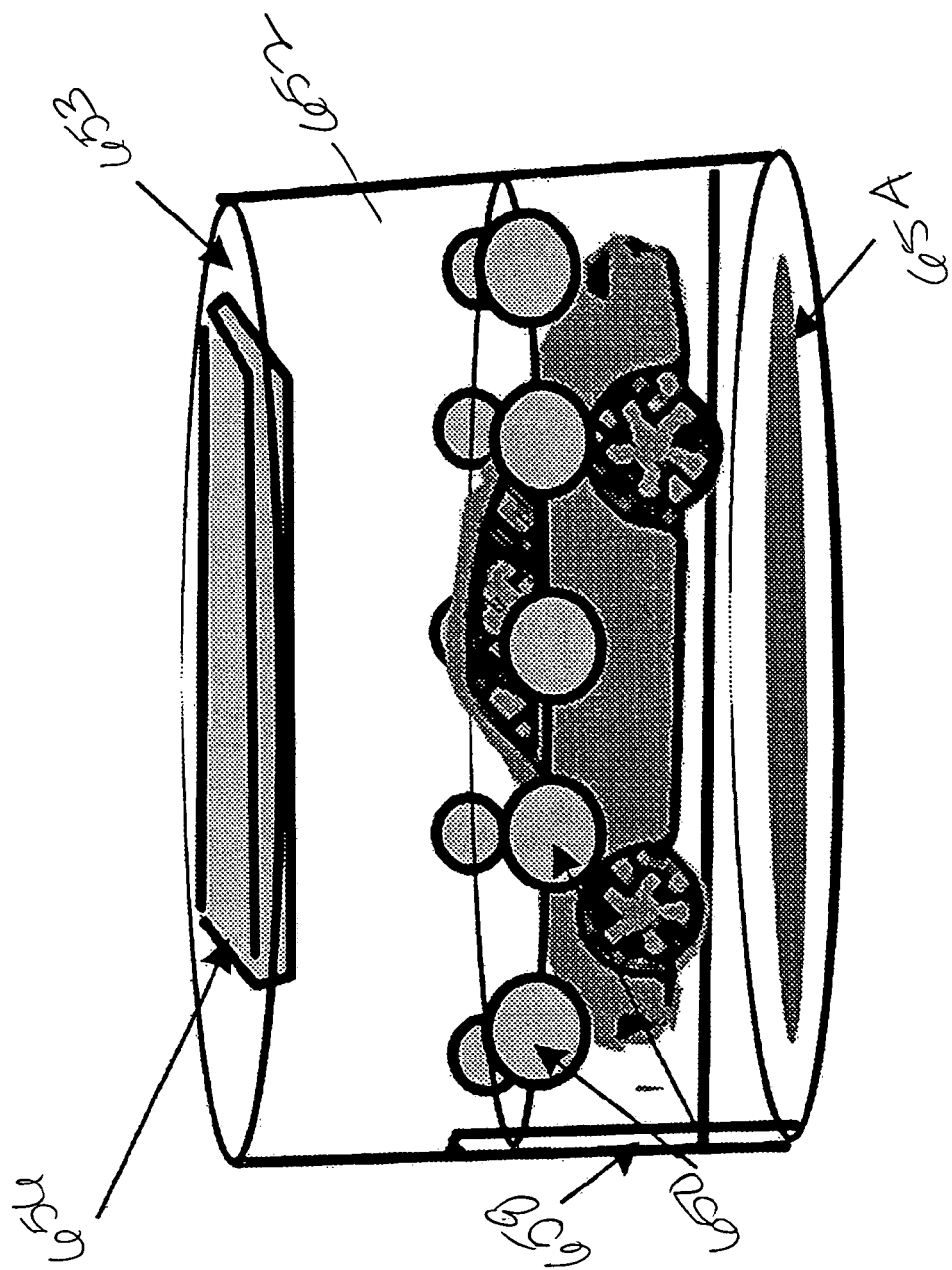
FIG. 23 is an elevational view of an image-capturing device according to another embodiment of a system according to the invention.

With reference to FIG. 23, a car-sized image-capturing device 600 is illustrated having a roughly cylindrically-shaped barrel 652 and a top surface 653 and a bottom surface 654. Multiple cameras or lenses 650 are provided around one circumference of the interior of the image-capturing device 600. Appropriate lighting 656 is provided in a top surface 653. A door 658 can be provided to allow ingress and egress with respect to the interior of the image-capturing device 600 in order to place objects inside and then remove the objects after the image capture process has been completed.

In still other alternative embodiments of an image-capturing device 600 of the system 10 according to the invention, the image-capturing device can be provided in the manner of a kiosk or old-fashioned photo booth. This form of image-capturing device 600 is believed likely to have special applicability when the object with respect to which image capture is desired is a person or an animal.

As noted above, there are virtually no size restrictions with respect to the image-capturing device 600 according to the present invention. For example, studio-sized image-capturing devices 600 can be provided with studio-quality lighting, to optimize image capture and minimize the need for editing the captured images later on. As with any type of lighting, the sophisticated lighting can be built-in to the image-capturing device. In other applications, a user might be able to choose from various types of lighting with different levels of quality which can be moved in and out of the image-capturing device on demand.

Optionally, various accessory equipment could be made available either as a part of or operating in conjunction with an image-capturing device 600 of the system 10 according to the invention, so that the user also might be provided with several options as to the form in which the captured image(s) is/are to be provided, e.g., as multiple image files on a compact disc or downloaded to a computer or wireless device, or in some form of printed media, such as on a lenticular sheet, or some other form of display.

In one preferred embodiment of the system 10 according to the invention, the image-capturing device 600 is coupled to a processor, which can be provided as a part of the image-capturing device 600 or otherwise associated with it, such as via a local or remote control station for the image-capturing device 600. The processor can be used to associate the captured image(s) with the software 20, or similar software, that enables one or more interactive functions to be carried out with respect to the image(s). Thus, the image(s) associated with the software 20 can be output to the user onto the user's hard drive or onto a disk, CD-ROM or other suitable device or otherwise transferred, e.g., by a wireless connection, from the image-capturing device 600 to a third party website (e.g., an on-line auction website), a user's website, or otherwise directly to a user via the user's computer, PDA, cell phone, or the like, and/or via email.

In alternate embodiments of the system 10 according to the invention, the interactive functions could be carried out on a display other than the screen of a computer or wireless device such as a PDA. For example, the interactive functions could be carried out on a lenticular sheet, by moving the eye relative to the lenticular sheet, or by moving the lenticular sheet relative to the eye, or by applying pressure to the lenticulae to change the angle at which light reflecting off of the lenticular sheet impacts the eye.

Figure 24:
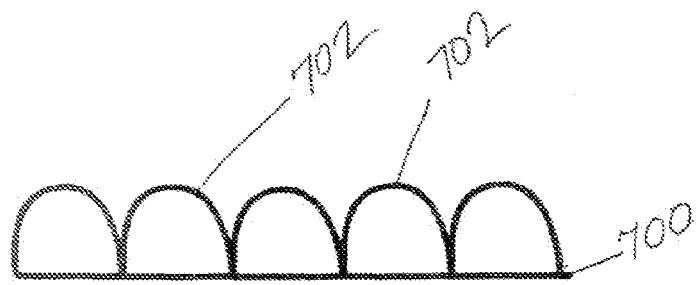
FIG. 24 is an elevational view of a portion of a lenticular sheet according to one embodiment of the invention.

With reference now to FIG. 24, an elevational view of a portion of a lenticular sheet 700 is illustrated, the portion shown having five lenticular lenses or lenticulae 702. Images 12 in a set of images 14 of the system 10 according to the invention can be associated with a lenticular sheet 700 by distributing equal portions of the images 12 across or among the lenticular lenses 702. The distribution can be accomplished by depositing strips or squares containing a portion of each image 12 either on each lenticular lens 702 directly, or by depositing the strips or squares on a surface that the lenticular lenses 702 subsequently are laid on top of or over. Alternatively, a geometric shape other than a square could be used, in order to the create the illusion of motion in a direction other than horizontally or vertically, or to create the illusion of some different interactive effect other than motion.

Figure 25:
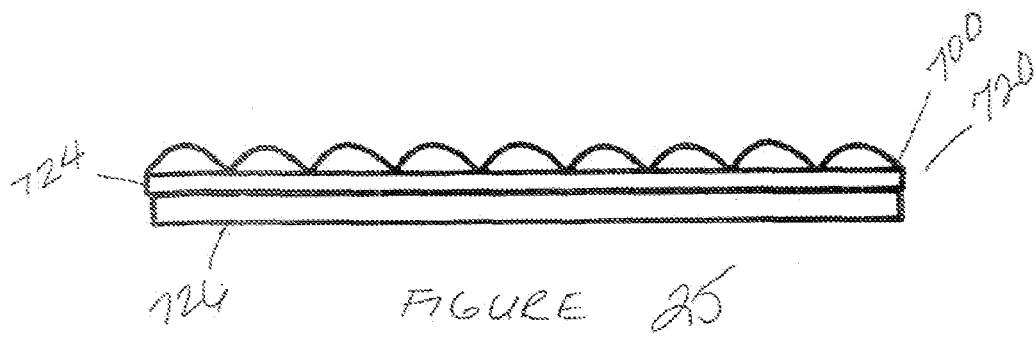
FIG. 25 is an elevational view of a portion of a lenticular sheet assembly according to one embodiment of the invention.

With reference to FIG. 25, and according to a preferred embodiment of a lenticular sheet assembly 720 in accordance with one aspect of the present invention, a lenticular sheet 700 is provided on which strips or squares corresponding to a set of images 14 have been deposited (e.g., by printing). A support surface 726 is provided to lie under the lenticular sheet 700 to, for example, lend stiffness or stability to the lenticular sheet 700. The support surface 726 preferably is adhered to the lenticular sheet 700 with a resilient material that will allow the lenticular sheet 700 to move relative to the support surface 726 when pressure is applied to the lenticular sheet 700. The lenticular sheet assembly 720 desirably is formed so that a gap exists between the lenticular sheet 700 and the support surface 726 when the resilient material is applied to connect the two. The gap can be filled with air, some other gas or a gel or gel-like material to facilitate and/or enhance the relative motion between the lenticular sheet 700 and the support surface 726. Alternatively, the lenticular sheet assembly 720 can be provided with a gap layer 724, disposed between the support surface 726 and the lenticular sheet 700 to allow some degree of motion of the lenticular sheet 700 with respect to the support surface 726. The gap layer 724 preferably is formed from a gel or gel-like material. Alternatively, the gap layer 724 is formed from a suitably flexible material, such as a plastic, to have a hollow interior that can be filled with air or some other gas. Preferably, the gap layer 724 is connected to the edges of the lenticular sheet 700 to either seal the gap layer 724 to, or to prevent the gap layer 724 from becoming dislodged from, the lenticular sheet 700, but the means used to connect the gap layer 724 to the lenticular sheet 700 should not be so rigid as to prevent an adequate degree of movement of the gap layer 724 relative to the lenticular sheet 700. Desirably, the means for connecting the film to the lenticular sheet comprises an elastomeric material or comparable adhesive.

The manner in which the lenticular sheet assembly 720 functions to give a user the illusion of motion or changing (or "morphing") an image from one object to another will now be described with reference to FIGS. 26, 27, 28, 29a and 29b. As noted above, current lenticular technology allows more than one image 12 to be apportioned and distributed over a plurality of lenticular lenses 702 so that each lens contains a portion of each image 12 in the form of a strip, square or other geometric shape selected in accordance with the desired interactive effect. In FIGS. 29a-29b, seven strips 750 are illustrated disposed on the top surface of a lenticular lens 702. When apportionment and distribution of the images 12 is accomplished using squares that are distributed among and disposed on the top surface of a lenticular lens 702, the shape of the squares allows a user to perceive the illusion of motion in two dimensions, e.g., vertically and horizontally. Alternatively, the strips 750 or the squares can be apportioned and distributed on a surface on which the lenticular sheet 700 will be made to overlie.

Figure 26:
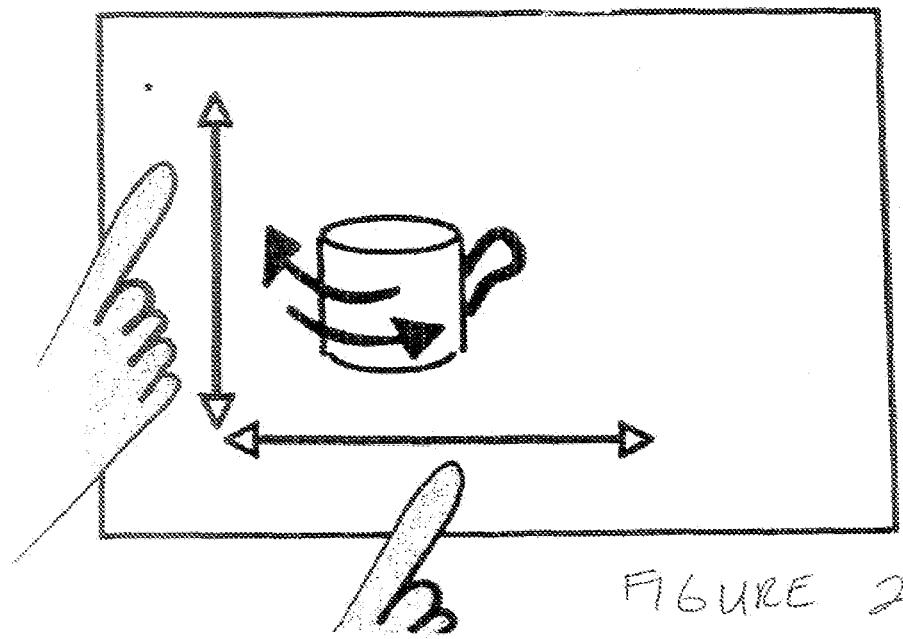
FIG. 26 is a schematic illustration of a lenticular sheet assembly according to one embodiment of the invention illustrating how an image disposed on the sheet would appear to move when pressure is applied to the sheet in one of two directions.
Figure 28:
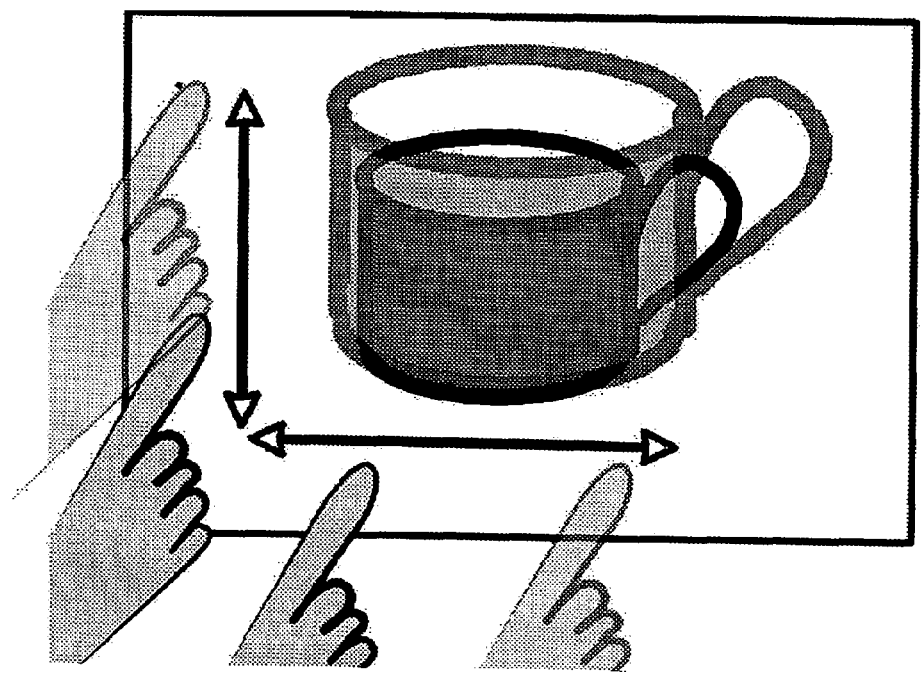
FIG. 28 is a schematic illustration of a lenticular sheet assembly according to another embodiment of the invention illustrating how an image disposed on the sheet would appear to become enlarged when pressure is applied to the sheet in one of two directions.
Figure 27:
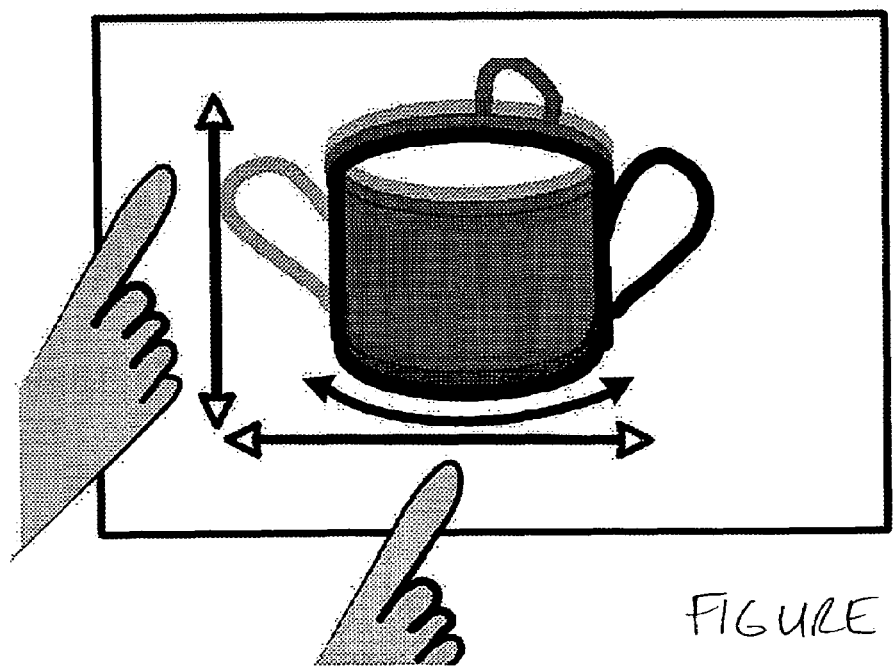
FIG. 27 is a schematic illustration of a lenticular sheet assembly according to one embodiment of the invention illustrating how an image disposed on the sheet would appear to move when pressure is applied to the sheet in one of two directions.
Figures 29A, 29B:
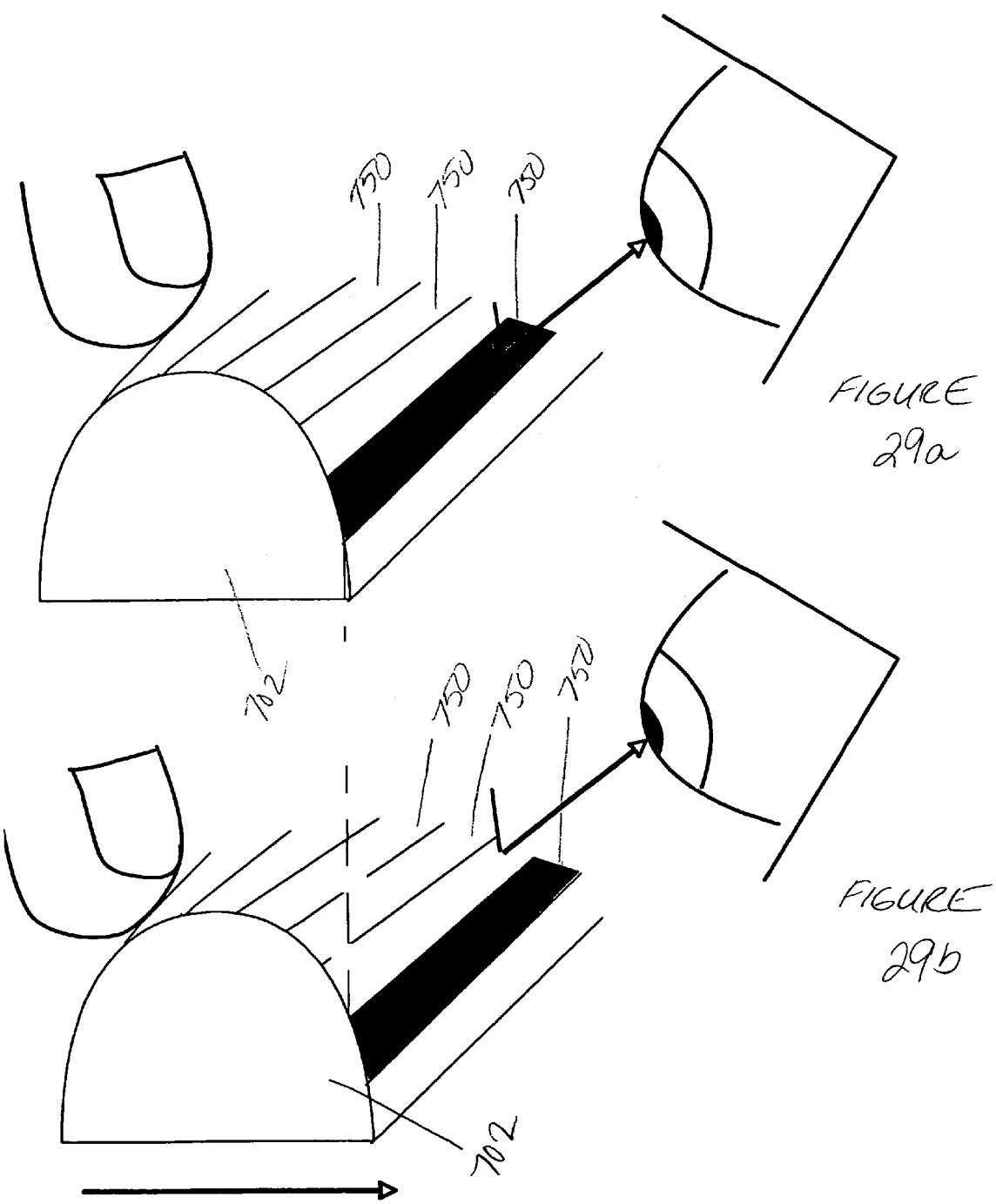
FIG. 29a is a schematic illustration of a lenticular lens according to one embodiment of the invention illustrating the portion of an image that would be visible to a viewer prior to the application of pressure to the lenticular sheet.
FIG. 29b is a schematic view of a lenticular lens according to one embodiment of the invention illustrating the portion of an image that would be visible to a viewer during the application of pressure to the lenticular sheet.

By way of example, a lenticular sheet 700 can be created in multiple images 12 of an object 16, such as of the mug illustrated in the examples shown in FIGS. 26-28, forming a set of images 14. Each of the images 12 is divided into a plurality of strips 750, for example, sixteen strips, and then the strips 750 are distributed over the lenticular lenses 702 on the lenticular sheet 700. The division of the images 12 into strips 750 and the depositing and distribution of the image information on the strips 750 onto the lenticular lenses 702 desirably is accomplished by appropriate image processing software in accordance the principles of the system 10 according to the invention described hereinabove.

If it is determined that sixteen images 12 are optimal for a set of images 14 that will result in a smooth 360-degree illusion of motion on the lenticular sheet 700, then there would be two-hundred-and-fifty-six (256) strips 750 under sixteen different lenticular lenses 702 delivered to and distributed over the lenticular sheet 700. When the strips are viewed together from different angles, and with reference to FIGS. 26 and 27, the resultant effect from the perspective of the viewer will be the illusion of a turning object. In addition, and with reference to FIG. 28, lenticular technology can be used to create a zoom effect, so that object 16 depicted in a set of images 14 disposed on a lenticular sheet 700 appears to change size, for example, as if the image is getting bigger. The change is scale of the image can also be accomplished by the same process of partitioning images 12 into strips 750 and then delivering and distributing the strips 750 over a series of lenticulae 702.

Typically, a viewer of a lenticular sheet 700 perceives the illusion of motion with respect to an object 16 rendered in a lenticular sheet 700 by moving the lenticular sheet 700 back and forth or bending it so as to change the angle of light that is reflected by the lenticular lenses 702 on the lenticular sheet 700, or by the user's adjusting his or her angle of view with respect to the lenticular sheet 700. Alternatively, and with reference to FIGS. 29a-29b, in accordance with the lenticular sheet assembly 720 of the system 10 of the present invention, a user can perceive the illusion of movement on a lenticular sheet 700, without the user having to move his or her head relative to the lenticular sheet or having to move or bend the lenticular sheet itself. Rather, the user can experience the illusion of motion of an object 16 in a set of images 14 rendered on a lenticular sheet 700 by applying pressure, for example, with a finger, to sequential portions of the lenticular sheet. The finger, as it moves, shifts the lenticular sheet 700 relative to the support surface 726 ever so slightly (such as by an increment on the order of millimeters or some fraction thereof), so as to shift the lenticular lenses 702 corresponding to the position of the user's finger. This shift in position changes the orientation of the lenticular lenses 702 to the light that is incident on the lenticular lenses, and accordingly results in the perception by the user that an object depicted in the image has moved, such as turned, or otherwise changed.

Figure 30:
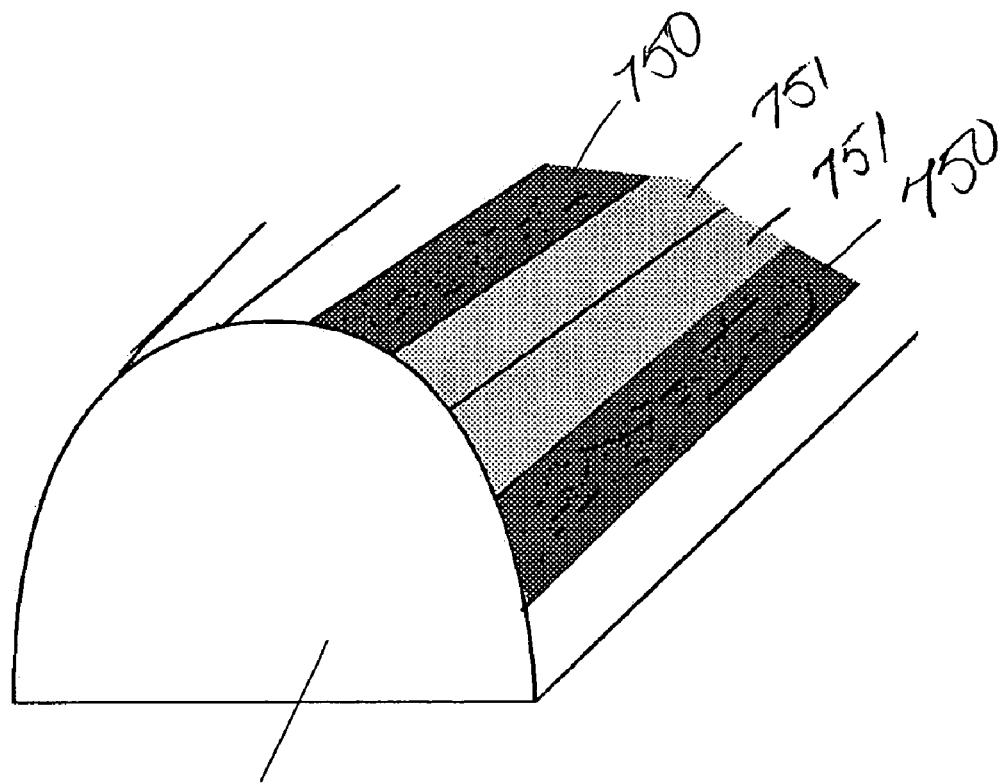
FIG. 30 is a perspective view of a lenticular lens according to another embodiment of the invention.

With reference now to FIG. 30, and in accordance with a preferred embodiment of a lenticular sheet assembly of the system 10 according to the invention, on a given lenticular lens 702a, each of strip 750 corresponding to one image 12 in a set of images 14 can be separated from the next strip 750 on that lenticular lens 702a by one or more blank strips 751. The blank strips 751 will minimize the possibility that the user will experience a "bleeding" effect during the transition time when one image deposited on the lenticular sheet 700 is moved out of the user's field of view and the next image is moved into the user's field of view (i.e., an effect where one image or parts of one image carry over into the next sequential image). The blank strips 751 can be colorless or can be colored to match whichever background colors are most predominant in the images as to the which the bleeding effect is intended to be avoided.

Accordingly, it will be appreciated that the invention provides a system for providing images to a user in a manner that the user perceives as enabling some form of interactivity with respect to the images, including but not limited to interactivity that results in the user perceiving the illusion of 2-D or 3-D motion of an object or objects depicted in the images. As will be readily apparent to a person of ordinary skill in the art and having the benefit of this disclosure, there will be a large number of possible ways of capturing the images described and subsequently processing the images captured in a manner that allows the images to be interacted with in some fashion when displayed, for example, in digital or analog form, or when rendered in printed form. All such applications are contemplated by the present invention, and may be used while staying within the inventive nature of the present disclosure. For example, the invention would have application in the fields of medicine (e.g., for diagnosis), security (e.g., for identification), education (e.g., for allowing a student to manipulate an object), entertainment (e.g., by studios for television and film projects), advertising (e.g., for product display), and so on and so forth. In addition, there are many more modifications than are mentioned above which are possible without departing from the inventive concepts contained herein. Thus, although the description above contains much specificity, the description should not be construed as limiting the scope of the invention; the descriptions given are merely providing an illustration of the embodiments of the invention. The scope of the invention is determined by the appended claims and their legal equivalents.

What is claimed is:

1. A machine-readable medium having program instructions stored thereon executable by a processing unit for performing the steps comprising:

processing at least one image so that one image layer is provided for each of the at least one images;

providing for the delivery of each image layer to a display device capable of displaying the at least one image layer;

displaying each image layer such that only one image layer is the currently viewable image layer from the point of view of a user at any given time;

providing a transparent layer that overlies the currently viewable image layer whereby the transparent layer is not perceptible from the point of view of the user; and enabling at least one interactive function that causes the software for providing the transparent layer to move the transparent layer from a first position on the display to a second position on the display and the currently viewable image layer to move to the second position on the display.

2. The machine-readable medium of claim 1, wherein the at least one image comprises a plurality of images of at least one object wherein each image represents a view of the at least one object that was captured at a different angle with respect to the at least one object.

3. The machine-readable medium of claim 1, wherein the at least one images image comprises a plurality of images of at least one object wherein the image represents a view of at least one object wherein each image represents a view of the at least one object that was captured at a different angle in a particular plane of the at least one object.

4. The machine-readable medium of claim 3, wherein each image in the plurality of images represents a view of the at least one object that is captured at a different angle in a particular plane of the at least one object through 0 to 360 degrees or some fraction thereof.

5. The machine-readable medium of claim 4, further comprising program instructions for enabling the at least one interactive function to display each image layer as the currently viewable image layer in at least one sequence to provide the illusion of movement in three dimensions.

6. The machine-readable medium of claim 5, further comprising program instructions for enabling the at least one interactive function to accept input from the user that controls the degree to which the user perceives the illusion of movement in three dimensions.

7. The machine-readable medium of claim 5, further comprising program instructions for enabling the at least one interactive function to accept input from the user that controls at least one of the degree to which and the speed with which the user perceives the illusion of movement in three dimensions.

8. The machine-readable medium of claim 1, further comprising program instructions for enabling the at least one interactive function to increase the resolution of the currently viewable image layer.

9. The machine-readable medium of claim 1, further comprising program instructions for enabling the at least one interactive function to increase the resolution of the currently viewable image layer by increasing the size of the currently viewable image layer by equal amounts in the horizontal direction and in the vertical direction.

10. The machine-readable medium of claim 1, further comprising program instructions for displaying the currently viewable image layer in a viewable area defined by an adjustable border.

11. The machine-readable medium of claim 10, further comprising program instructions for enabling the at least one interactive function to increase the resolution of the currently viewable image layer and the size of the adjustable border of the viewing area.

12. The machine-readable medium of claim 10, further comprising program instructions for enabling the at least one interactive function to increase the resolution of the currently viewable image layer by increasing the size of the currently viewable image layer by equal amounts in the horizontal direction and the vertical direction.

13. The machine-readable medium of claim 10, further comprising program instructions for enabling the at least one interactive function to increase the resolution of the currently viewable image layer by increasing size of the currently viewable image layer by equal amounts in the horizontal direction and the vertical direction.

14. The machine-readable medium of claim 11, wherein the increase in size of the currently viewable image layer and the increase in size of the adjustable border of the viewing area is substantially the same.

15. The machine-readable medium of claim 1, further comprising program instructions for enabling the at least one interactive function to move the currently viewable image layer from a first position on the display to a second position on the display.

16. The machine-readable medium of claim 1, further comprising program instructions for displaying a tool bar layer in which a tool bar is disposed, wherein the tool bar layer is perceptible from the point of view of the user along with the currently viewable image layer.

17. The machine-readable medium of claim 1, further comprising program instructions for providing a first transparent layer that overlies the currently viewable image layer and a second transparent layer that lies between the first transparent layer and the currently viewable image layer whereby the first transparent layer and second transparent layer are not perceptible from the point of view of the user.

18. The machine-readable medium of claim 17, further comprising program instructions for enabling the at least one interactive function to allow the first transparent layer to from a first position with respect to the second transparent layer to a second position, whereby a line perceptible from the point of view of the user is drawn on the second transparent layer that corresponds to the distance between the first position and the second position.

19. The machine-readable medium of claim 18, wherein the distance between the first position and the corresponds to an actual physical dimension of an object depicted in the at least one image.

20. The machine-readable medium of claim 1, further comprising program instructions for providing a transparent layer that overlies the currently viewable image layer whereby the transparent layer is not perceptible from the point of view of the user.

21. The machine-readable medium of claim 20, further comprising program instructions for enabling the at least one interactive function to move the transparent layer from a first position on the display to a second position on the display.

22. The machine-readable medium of claim 20, further comprising program instructions for enabling the at least one interactive function to move the transparent layer from a first position on the display to a second position on the display and the currently viewable image layer to move to the second position on the display.

23. A system for delivering and allowing interactivity with images so as to provide a virtual three-dimensional effect to a user on a display, comprising:
  a plurality of images of at least one object, the plurality of images being combined to form a set of images; and
  a computer-readable medium having program instructions stored thereon executable by a processing unit performing the steps of:
  displaying the set of images such that only one of the images will be perceivable by a user on a display at a given point in time;
  enabling at least one interactive function to be carried out with respect to the set of images, wherein at least one interactive function will give the user the illusion that the object is moving in three dimensions;
  providing a transparent layer that overlies the currently perceivable image whereby the transparent layer is not perceptible from the point of view of the user; and
  enabling the at least one interactive function to effect the transparent layer to move the transparent layer from a first position on the display to a second position on the display and the currently perceivable image to move to the second position on the display.

24. The system of claim 23, wherein the plurality of images are digital images.

25. The system of claim 24, wherein the language of the program instructions is dynamic hypertext markup language.

26. The system of claim 24, wherein the language of the program instructions is a combination of dynamic hypertext mark up language and JAVASCRIPT.

27. The system of claim 23, wherein the machine-readable medium further comprises program instruction for performing the step of providing each image in a separate image layer, and only one such image layer is viewable by a user at any given time.

28. The system of claim 23, wherein the plurality of images further comprise different images of the at least one object which are captured in at least one plane of the object through 0 to 360 degrees or some fraction thereof.

29. The system of claim 28, wherein the machine-readable medium further comprises program instructions for performing the step of simulating the rotation of the object through three dimensions by first displaying and then hiding each image layer to the user in at least one sequence at discrete increments of time.

30. The system of claim 29, wherein the discrete increments of time are capable being specified by the user.

31. The system of claim 23, wherein the plurality of images further comprise different images of the at least one object which are captured in a plurality of planes of the object through 0 to 360 degrees or some fraction thereof.

32. The system of claim 31, wherein the machine-readable medium further comprises program instructions for performing the step of simulating the rotation of the object through three dimensions in each of the plurality of planes by sequentially first displaying and then hiding each image layer to the user at discrete increments of time.

33. The system of claim 23, wherein the machine-readable medium further comprises program instructions for performing the step of providing a tool bar layer that is perceivable by the user in addition to the one image layer viewable by the user at any given time.

34. The system of claim 23, wherein the machine-readable medium further comprises program instructions for performing the step of providing each image in a separate layer, wherein each image layer has approximately the same height and width as ever other image layer, and only one such image layer is viewable by a user at any given time.

35. The system of claim 34, wherein the machine-readable medium further comprises program instructions for performing the step of providing a transparent layer which is sized to approximate the height and width of the image layers and is disposed on top whichever one image layer is viewable by a user at any given time.

36. The system of claim 23, wherein the machine-readable medium further comprises program instructions for performing the step of enabling the at least one object in the set of images to be moved in the horizontal, vertical, or diagonal directions on the display.

37. The system of claim 23, wherein the machine-readable medium further comprises program instructions fur performing the step of enabling the at least one object in the set of images to be zoomed in on to a selected degree.

38. The system of claim 37, wherein the selected degree is controlled by a zoom factor.

39. The system of claim 23, wherein the machine-readable medium further comprises program instructions for performing the step of enabling at least one dimension of the at least one collect to be measured and correlated with a corresponding actual physical dimension of the at least one object.

40. The system of claim 23, wherein the machine-readable medium further comprises program instructions for performing the step of enabling the at least one object in the set of images to be moved in the horizontal, vertical, or diagonal directions on the display by calculating the difference between a first x coordinate and a first y coordinate on the transparent layer and a second x coordinate and a second y coordinate on the transparent layer and by translating the image layers in the set of images a distance on the display corresponding to the difference.

41. A system for delivering and allowing interactivity with images so as to provide an interactive two dimensional effect to a user on a display, comprising:
  at least one image of at least one object, the at least one image comprising a set of images; and a computer-readable medium having program instructions stored thereon executable by a processing unit for performing the steps of:

displaying the set of images such that only one of the images will be perceivable by a user on the display at a given point in time;

providing a transparent lever that overlies the currently perceivable image whereby the transparent layer is not perceptible from the point of view of the user; and enabling at least one interactive function that causes the software for providing the transparent layer to move the transparent layer from a first position on the display to a second position on the display and the currently perceivable image to move to the second position on the display.

42. A system for delivering and allowing interactivity with images so as to provide an interactive two-dimensional effect to a user on a display, comprising:

at least one image of at least one object, the at least one image comprising set of images; and a computer-readable medium having program instructions stored thereon executable by a processing unit fur performing the steps of:

displaying the set of images such that only one of the images will be perceivable by a user on the display at a given point in tame;

enabling at least one interactive function to be carried out with respect to the set of, whereby at least one interactive function will give the user the illusion that the object is increasing in size on the display.

43. A system for delivering and allowing interactivity with images so as to provide an interactive two-dimensional effect to a user on a display, comprising:

at least one image of at least one object, the at least one image comprising a set of images; and a computer-readable medium having program instructions stored thereon executable by a processing unit for performing the steps of:

displaying the set of images such that only one of the images will be perceivable by a user on the display at a given point in time;

enabling at least one active function to be carried out with respect to the set of images, whereby at least one interactive function will give the use the illusion that the object is being moved from a first position to a second position on the display;

providing a transparent layer that overlies the currently perceivable image whereby the transparent layer is not perceptible from the point of view of the user; and enabling the at least one interactive function to effect movement of the transparent layer from a first position on the display to a second position on the display and the currently perceivable image to move to the second position on the display.

44. A method for interacting with images comprising:

providing at least one image in a digital format;

processing the at least one image so that one image layer is provided for each of the at least one images;

delivering the at least one image layer to a user, so that only one of the at least one image layers is perceptible to the user at any given point in time;

enabling at least one interactive function with respect to the at least one image, so that the user perceives the illusion of motion in two dimensions or three dimensions;

providing a transparent layer that overlies a currently perceptible image layer whereby the transparent layer is not perceptible from the point of view of the user; and enabling the at least one interactive function that effects the transparent layer to move the transparent layer from a first position on the display to a second position on the display and the currently perceptible image layer to move to the second position on the display.

45. The method of claim 44, wherein enabling the at least one interactive function includes enlarging the image in the at least one image layer that is perceptible to the user to increase resolution of the image.

46. The method of claim 45, wherein enlarging the image in the at least one image layer that is perceptible to the user enlarges the image to an equal degree in the horizontal direction and in the vertical direction.

47. A system for capturing at least one image of an object comprising:

an image-capturing device further comprising:

an area in which an object can be disposed for imaging, the area having an interior surface and an exterior surface;

at least one lens coupled to a camera, the at least one lens being in operable communication with the interior of the area;

means for commanding the at least one camera to acquire the at least one image of the object via the at least one lens;

means for delivering the at least one image to a computer readable storage device;

a machine-readable medium having program instructions stored thereon executable by a processing unit configured for rendering the at least one image interactive from the point of view of a user for performing the step of:

uploading the at least one image from a storage device into the machine-readable medium;

processing the uploaded at least one image so that an image layer is provided for each of the at least one image;

delivering each image layer to a user on a display, causing only one image layer to be perceptible to the user at any given time, whereby the image layer perceptible to the user at any given time is the currently viewable image layer;

enabling at least one interactive function with respect to the at least one image to provide to the user the illusion of motion in two dimensions or three dimensions on the display;

providing a transparent layer that overlies a currently viewable image layer, whereby the transparent layer is not perceptible from the point of view of the user; and enabling the at least one interactive function to be carried out by moving the transparent layer from a first position on the display to a second position on the display and by moving the currently viewable image layer to the second position.

48. The system of claim 47, wherein the interior surface is cylindrically shaped.

49. The system of claim 47, wherein the interior surface is spherically shaped.

50. A system for capturing a set of images of an object that can be displayed to a user so as to provide the user with a three-dimensional effect with respect to the object, comprising:

an enclosure having a closeable opening through which the object to be imaged can be inserted;

at least one lens coupled to a device for capturing the set of images disposed in the interior of the enclosure;

a lighting source delivered to the interior of the enclosure to illuminate the object during the image capturing process;

means for commanding the at least one camera to acquire the at least one image of the object via the at least one lens;

means for delivering the at least one image to a machine-readable storage device a machine-readable medium having program instructions stored thereon executable by a processing unit configured for rendering the at least one image interactive from the point of view of a user for performing the step of:

uploading the at least one image from a storage device into the machine-readable medium; delivering each layer to a user on a display, causing only image layer to be perceptible to the user at any given time, whereby the image layer perceptible to the user at any given time is the currently viewable image layer;

enabling at least one interactive function with respect to the at least one image to provide to the user the illusion of motion in two dimensions or three dimensions on the display;

providing a transparent layer that overlies a currently viewable image layer, whereby the transparent layer is not perceptible from the point of view of the user; and enabling the at least one interactive function to be carried out by moving the transparent layer from a first position on the display to a second position on the display and by moving the currently viewable image layer to the second position.

51. A system for capturing a plurality of images of an object, comprising:

an image-capturing device having:

an area in which an object can be disposed for imaging, the area having an interior surface lane an exterior surface;

at least one lens coupled to a at least one camera, the at least one lens being in operable communication with the interior of the area;

means for commanding the at least one camera to acquire a first image of the object via the at least one;

means for moving the at least one camera relative to the object; means for commanding the at least one camera to acquire a second image of the object via the at least one lens;

means to r processing the first image and second image so that the first image and the second image are provided in at least one image layer;

a machine-readable medium having program instructions stored thereon executable by a processing unit configured for rendering the at least one image interactive from the point of view of a user for performing the step of:

uploading the at least one image from a storage device into the machine-readable medium; delivering each image layer to a user on a display, causing only one image layer to be perceptible to the user at any given time, whereby the image layer perceptible to the user at any given time is the currently viewable image layer;

enabling at least one interactive function with respect to the at least one image to provide to the user the illusion of motion in two dimensions or three dimensions on the display;

providing a transparent layer that overlies a currently viewable image layer, whereby the transparent layer is not perceptible from the point of view of the user; and enabling the at least one interactive function to be carried out by moving the transparent layer from a first position on the display to a second position on the display and by moving the currently viewable image layer to the second position.

52. The system of claim 51, wherein the means for moving the camera relative to the object as images in the set of images are captured is software that controls movement of the lens.

53. A system for capturing at least one image of an object comprising:

a computer usable medium having computer readable program code embodied therein configured for rendering at least one image that is interactive from the point of view of a user comprising:

computer readable code configured to upload the at least one image from a storage device into the computer usable medium having computer readable program code embodied therein;

computer readable code configured to process the uploaded at least one image so that an image layer is provided for the at least one image;

computer readable code configured to deliver the image layer to a user on a display, causing time whereby the image layer perceptible to the user at any given time is the currently viewable image layer;

computer readable code configured to enable at least one interactive function with respect to the at least one image, so that the user perceives the illusion of motion in two dimensions or three dimensions on the display;

computer readable code configured to provide a transparent layer that overlies a currently viewable image layer whereby the transparent layer is not perceptible from the point of view of the user; and computer readable code configured to enable the at least one interactive function to be carried out by moving the transparent layer from a first position on the display to a second position on the display an by moving the currently viewable image layer to the second position.

* * * * *

UNITED STATES PATENT AND TRADEMARK OFFICE
CERTIFICATE OF CORRECTION

PATENT NO. : 7,262,783 B2  Page 1 of 3
APPLICATION NO. : 10/791965
DATED : August 28, 2007
INVENTOR(S) : Gary Kramer et al.

It is certified that error appears in the above-identified patent and that said Letters Patent is hereby corrected as shown below:

In the Claims:

In Claim 23 at column 33:
At line 35, change "a user" to --the user--
At line 35, change "a display" to --the display--
At lines 38-39, change "wherein at least one interactive function" to --wherein the at least one interactive function--
At line 39, change "the illusion" to --an illusion--
At line 44, change "effect" to --affect--
At line 47, change "the currently perceivable image to move" to --to move the currently perceivable image--

In Claim 27 at column 33:
At lines 57-58, change "machine-readable" to --computer-readable--
At line 60, delete "such" before "image layer"

In Claim 34 at column 34:
At lines 23-24, change "machine-readable" to --computer-readable--

In Claim 35 at column 34:
At lines 29-30, change "machine-readable" to --computer-readable--
At line 33, change "on top whichever" to --on top of whichever--

In Claim 36 at column 34:
At lines 35-36, change "machine-readable" to --computer-readable--

In Claim 37 at column 34:
At lines 40-41, change "machine-readable" to --computer-readable--

In Claim 39 at column 34:
At lines 47-48, change "machine-readable" to --computer-readable--

Signed and Sealed this

Twenty-fourth Day of August, 2010

David J. Kappos
*Director of the United States Patent and Trademark Office*

CERTIFICATE OF CORRECTION (continued)
U.S. Pat. No. 7,262,783 B2

In Claim 43 at column 35:
At line 41, change "a user" to --the user--
At line 43, change "at least one active function" to --the least one interactive function--
At line 45, change "use" to --user--
At line 45, change "the illusion" to --an illusion--
At line 54, change "the currently perceivable image to move" to --to move the currently perceivable image--

In Claim 44 at columns 35-36:
At column 35, lines 65-66, change "the illusion" to --an illusion--
At column 36, line 5, change "effects" to --affects--
At column 36, line 7, change "the display" to --a display--

In Claim 47 at column 36:
At the beginning of line 20, insert --(a)--
At line 20, delete "further"
At line 21, change "an object" to --the object--
At line 27, change "the at least one camera" to --the camera--
At the end of line 31, insert --and--
At the beginning of line 32, insert --(b)--
At line 35, change "step" to --steps--
At line 37, change "a storage device" to --the storage device--
At line 42, change "a user" to --the user--
At line 48, change "the illusion" to --an illusion--

In Claim 51 at column 37:
At the beginning of line 38, insert --(a)--
At line 40, change "lane" to --and--
At line 46, change "at least one" to --at least one lens--
At line 51, change "to r processing" to --for processing--
At line 51, change "the first image and second image" to --the first image and the second image--
At line 52, change "the first image and the second image" to --each of the first image and the second image--
At the end of line 53, insert --and--
At the beginning of line 54, insert --(b)--
At line 56, change "the at least one image" to --the plurality of images--
At line 57, change "step" to --steps--

In Claim 51 at column 38:
At line 1, change "image" to --image layer--
At line 3, change "a user" to --the user--
At line 8, change "image" to --image layer--
At line 8, change "the illusion" to --an illusion--
At lines 11-12, change "a currently viewable image layer" to --the currently viewable image layer--

In Claim 53 at Column 38:
At line 40, change "a user" to --the user--
At line 40, between the words "causing" and "time" insert --only one image layer to be perceptible to the user at any given--
At line 40, insert a --,-- after the word "time" (before the word "whereby")
At line 48, change "a currently viewable image layer" to --the currently viewable image layer--
At line 55, change "an" to --and--